United States Patent [19]

Mihara et al.

[11] Patent Number: 5,481,757
[45] Date of Patent: Jan. 2, 1996

[54] CATV TERMINAL DEVICE IN TWO-WAY COMMUNICATION CATV SYSTEM

[75] Inventors: Yoshikazu Mihara, Kawanishi; Yuji Yamamoto, Yawata, both of Japan

[73] Assignee: Sanyo Electric Co., Ltd., Osaka, Japan

[21] Appl. No.: 141,335

[22] Filed: Oct. 26, 1993

[30] Foreign Application Priority Data

| | | | |
|---|---|---|---|
| Oct. 26, 1992 | [JP] | Japan | 4-287580 |
| Oct. 29, 1992 | [JP] | Japan | 4-291578 |
| Oct. 29, 1992 | [JP] | Japan | 4-291579 |
| Oct. 29, 1992 | [JP] | Japan | 4-291580 |

[51] Int. Cl.$^6$ .............................. H04H 1/00; H04N 7/14
[52] U.S. Cl. ..................... 455/3.1; 455/5.1; 455/4.2; 348/12; 348/10
[58] Field of Search ................... 348/12, 13, 20, 348/17, 15, 10; 455/3.1, 5.1, 4.1, 4.2, 6.1; 358/86; H04N 7/14, 7/173

[56] References Cited

U.S. PATENT DOCUMENTS 4,860,379 8/1989 Schoeneberger .................. 455/4.1
5,318,450 6/1994 Carver .............................. 348/8

OTHER PUBLICATIONS

Articles OQE89-92 and OCS89-51, entitled "An FM-FDM Hi-Vision optical CATV system employing demand access method", by Maeda et al, NHK Science and Technical Research Laboratories, Nov. 21, 1989, published by Institute of Electronics and Communication Engineers of Japan.

Primary Examiner—Victor R. Kostak
Assistant Examiner—Sherrie Hsia
Attorney, Agent, or Firm—Nikaido, Marmelstein, Murray & Oram

[57] ABSTRACT

A two-way communication CATV system has a CATV broadcasting station, a relay device, and a plurality of CATV terminal devices. The CATV terminal device in the two-way communication CATV system includes a storing device for storing a recognition number, a frequency determining device for determining the frequency of a broadcasting signal transmitted from the relay device, and a recognition number setting device for determining a recognition number depending on the frequency determined by the frequency determining device and storing the determined recognition number in the storing device.

19 Claims, 12 Drawing Sheets

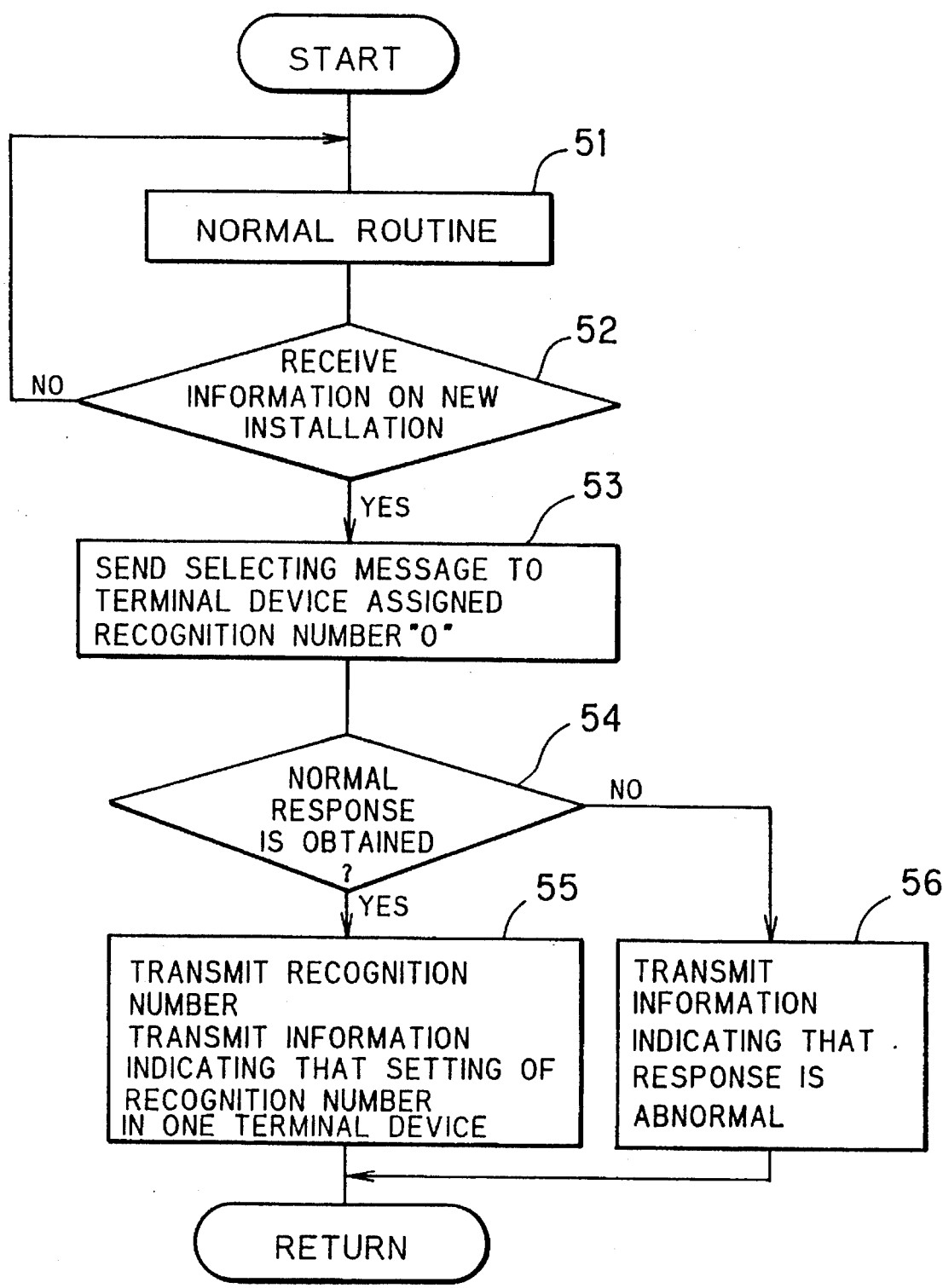

CATV TERMINAL DEVICE IN TWO-WAY COMMUNICATION CATV SYSTEM

BACKGROUND OF THE INVENTION

FIELD OF THE INVENTION

The present invention relates to CATV terminal devices in a two-way communication CATV system capable of automatically setting recognition numbers respectively assigned to the CATV terminal devices.

DESCRIPTION OF THE PRIOR ART

One example of two-way communication CATV systems include an FM-FDM High-vision optical CATV system employing a demand access method (see articles OQE89-92 and OCS89-51, entitled "An FM-FDM Hi-Vision optical CATV system employing demand access method", by Mikio Maeda, Tadasu Sunada, Yosuke Endo, and Kimiyuki Oyamada, NHK Science and Technical Research Laboratories, Nov. 21, 1989, published by Institute of Electronics and Communication Engineers of Japan).

In the FM-FDM High-vision optical CATV system employing a demand access method, an FM multiple signal including broadcasting signals corresponding to a plurality of channels is sent to a hub from a CATV broadcasting station. A signal corresponding to a channel desired by each of a plurality of CATV terminal devices is sent to the CATV terminal device through a subscriber terminating device from the hub.

In the FM-FDM High-vision optical CATV system employing a demand access method, therefore, the plurality of CATV terminal devices exist for one hub. Consequently, a recognition number (an address) must be set in each of the CATV terminal devices in order for the CATV broadcasting station to communicate with the CATV terminal device.

Conventionally, the recognition number assigned to the CATV terminal device has been set at the time of manufacturing the CATV terminal device, or has been set by a DIP switch provided for the CATV terminal device when the CATV terminal device is installed in each home.

When the recognition number assigned to the CATV terminal device is set at the time of manufacturing the CATV terminal device, however, the number of manufacturing processes of the CATV terminal device is increased, and a plurality of types of terminal devices exist so that the management of products becomes complicated. On the other hand, when the recognition number assigned to the CATV terminal device is set by the DIP switch provided for the CATV terminal device, it is necessary for a person in charge of installation to manually operate the DIP switch, so that work efficiency is low.

SUMMARY OF THE INVENTION

An object of the present invention is to provide CATV terminal devices in a two-way communication CATV system capable of automatically setting recognition numbers respectively assigned to the CATV terminal devices and a device for and a method of automatically setting recognition numbers assigned to CATV terminal devices in a two-way communication CATV system.

Another object of the present invention is to provide CATV terminal devices in a two-way communication CATV system capable of normally timer-recording a chargeable broadcasting program.

Still another object of the present invention is to provide CATV terminal devices in a two-way communication CATV system capable of retrieving a program desired by a viewer in a short time and simply.

In a two-way communication CATV system comprising a CATV broadcasting station for transmitting a CATV broadcasting signal including frequency-division-multiplexed broadcasting signals corresponding to a plurality of channels, a plurality of CATV terminal devices respectively assigned different particular frequencies for transmitting channel request signals for requesting channels desired out of the plurality of channels, and a relay device for receiving the CATV broadcasting signal transmitted from the CATV broadcasting station as well as receiving the channel request signals transmitted from the CATV terminal devices, frequency-converting the broadcasting signal corresponding to the channel requested by the channel request signal transmitted from each of the CATV terminal devices out of the broadcasting signals corresponding to the plurality of channels included in the CATV broadcasting signal into a broadcasting signal having the particular frequency assigned to the corresponding CATV terminal device and transmitting the broadcasting signal to the corresponding CATV terminal device, a CATV terminal device in a first two-way communication CATV system according to the present invention is characterized by comprising storing means for storing a recognition number, frequency determining means for determining the frequency of the broadcasting signal transmitted from the relay device, and recognition number setting means for determining a recognition number depending on the frequency determined by the frequency determining means and storing the determined recognition number in the storing means.

The particular frequency assigned to each of the above described CATV terminal devices is selected from frequencies corresponding to channel BS-1, channel BS-5, channel BS-9 and channel BS-13.

The above described frequency judging means comprises, for example, an oscillator whose oscillation frequency can be varied, a mixer for frequency-converting the broadcasting signal transmitted from the above described relay device depending on the oscillation frequency of the oscillator, a band-pass filter for passing only a signal component, in a predetermined intermediate frequency band, of an output signal of the mixer, first determining means for determining whether or not the value of the signal component in the predetermined intermediate frequency band which is output from the band-pass filter is not less than a predetermined threshold value, and second determining means for determining the frequency of the broadcasting signal transmitted from the relay device on the basis of the results of the determination made by the first determining means when the oscillation frequency of the oscillator is changed into a plurality of frequencies, which are respectively determined for the particular frequencies assigned to the above described CATV terminal devices, for converting the particular frequencies into a frequency in the particular intermediate frequency band.

Examples of the above described relay device include one constituted by a hub and a terminating device. The hub comprises, for example, means for receiving the CATV broadcasting signal transmitted from the above described CATV broadcasting station as well as receiving the channel request signals transmitted from the above described CATV terminal devices through the terminating device, means for frequency-converting the broadcasting signal corresponding to the channel requested by the channel request signal transmitted from each of the CATV terminal devices out of the broadcasting signals corresponding to the plurality of channels included in the CATV broadcasting signal into the broadcasting signal having the particular frequency assigned to the corresponding CATV terminal device, and means for frequency-division-multiplexing the plurality of broadcasting signals obtained by the frequency-conversion to generate a broadcasting multiple signal and transmitting the generated broadcasting multiple signal to the terminating device.

The above described terminating device comprises, for example, means for separating the broadcasting multiple signal transmitted from the above described hub into the broadcasting signals having the particular frequencies respectively assigned to the above described CATV terminal devices to respectively transmit the broadcasting signals to the corresponding CATV terminal devices, and means for receiving the channel request signals transmitted from the respective CATV terminal devices to transmit the channel request signals to the hub.

In a two-way communication CATV system comprising a communication control station and a plurality of CATV terminal devices connected to the communication control station, different recognition numbers being respectively set in the CATV terminal devices, a method of automatically setting recognition numbers assigned to CATV terminal devices in the two-way communication CATV system according to the present invention is characterized in that a temporary recognition number different from a normal recognition number is automatically set in a newly subscribed CATV terminal device, the communication control station transmits an inquiry message for inquiring of the newly subscribed CATV terminal device whether or not receiving is possible using the temporary recognition number, the newly subscribed CATV terminal device transmits a response message indicating that receiving is possible to the communication control station when it receives the inquiry message from the communication control station, the communication control station transmits the normal recognition number to the newly subscribed CATV terminal device when it receives the response message indicating that receiving is possible from the newly subscribed CATV terminal device, and the newly subscribed CATV terminal device sets, when it receives the normal recognition number from the communication control station, the received normal recognition number as a recognition number assigned to the CATV terminal device.

In a two-way communication CATV system comprising a communication control station and a plurality of CATV terminal devices connected to the communication control station, different recognition numbers being respectively see in the CATV terminal devices, a device for automatically setting recognition numbers assigned to CATV terminal devices in the two-way communication CATV system according to the present invention is characterized by comprising means provided for a newly subscribed CATV terminal device for automatically setting a temporary recognition number different from a normal recognition number in the newly subscribed CATV terminal device, means provided for the communication control station for transmitting an inquiry message for inquiring of the newly subscribed CATV terminal device whether or not receiving is possible using the temporary recognition number, means provided for the newly subscribed CATV terminal device for transmitting a response message indicating that receiving is possible to the communication control station when it receives the inquiry message from the communication control station, means provided for the communication control station for transmitting the normal recognition number to the newly subscribed CATV terminal device when it receives the response message indicating that receiving is possible from the newly subscribed CATV terminal device, and means provided for the newly subscribed CATV terminal device for setting, when it receives the normal recognition number from the communication control station, the received normal recognition number as a recognition number assigned to the CATV terminal device.

The two-way communication CATV system to which the method of and the device for automatically setting recognition numbers assigned to CATV terminal devices comprises, for example, a CATV broadcasting station for transmitting a CATV broadcasting signal including frequency-division-multiplexing broadcasting signals corresponding to a plurality of channels, a plurality of CATV terminal devices respectively assigned different particular frequencies for transmitting channel request signals for requesting channels desired out of the plurality of channels, and a relay device for receiving the CATV broadcasting signal transmitted from the CATV broadcasting station as well as receiving the channel request signals transmitted from the CATV terminal devices, frequency-converting the broadcasting signal corresponding to the channel requested by the channel request signal transmitted from each of the CATV terminal devices out of the broadcasting signals corresponding to the plurality of channels included in the CATV broadcasting signal into a broadcasting signal having the particular frequency assigned to the corresponding CATV terminal device and transmitting the broadcasting signal to a subscriber's home where the corresponding CATV terminal device is installed. The above described communication control station is provided for the relay device in this two-way communication CATV system.

The particular frequency assigned to each of the above described CATV terminal devices is selected from frequencies corresponding to, for example, channel BS-1, channel BS-5, channel BS-9 and channel BS-13.

Examples of the above described relay device in the above described two-way communication CATV system include one constituted by a hub and a terminating device. In this case, the above described communication control station is provided for the above described hub. The hub comprises, for example, means for receiving the CATV broadcasting signal transmitted from the above described CATV broadcasting station as well as receiving the channel request signals transmitted from the above described CATV terminal devices through the terminating device, means for frequency-converting the broadcasting signal corresponding to the channel requested by the channel request signal transmitted from each of the CATV terminal devices out of the broadcasting signals corresponding to the plurality of channels included in the CATV broadcasting signal into a broadcasting signal having the particular frequency assigned to the corresponding CATV terminal device, and means for frequency-division-multiplexing the plurality of broadcasting signals obtained by the frequency-conversion to generate a broadcasting multiple signal and transmitting the generated broadcasting multiple signal to the terminating device.

The above described terminating device comprises means for separating the broadcasting multiple signal transmitted from the above described hub into broadcasting signals for subscribers' homes where the corresponding CATV terminal devices are respectively installed to respectively transmit the broadcasting signals to the corresponding subscribers' homes, and means for receiving the channel request signals transmitted from the respective CATV terminal devices to transmit the channel request signals to the hub.

In a two-way communication CATV system comprising a CATV broadcasting station and a CATV terminal device, in which when a chargeable broadcasting program provided from the CATV broadcasting station is received by the CATV terminal device, the chargeable broadcasting program can be continuously viewed in a normal state only when a predetermined authentication signal is transmitted from the CATV terminal device to the CATV broadcasting station within a predetermined time period, a CATV terminal device in a second two-way communication CATV system according to the present invention is characterized by comprising setting means for setting receiving time and a channel to be received at the receiving time, receiving channel switching means for switching a receiving channel to the channel set in the setting means when the time set by the setting means has arrived, determining means for determining whether a received program on the channel to which the receiving channel is switched by the channel switching means is a chargeable broadcasting program or a no-chargeable broadcasting program on the basis of control data transmitted from the CATV broadcasting station, and means for transmitting the particular authentication signal to the CATV broadcasting station within the predetermined time period when the determining means determines that the received program is the chargeable broadcasting program.

In a two-way communication CATV system comprising a CATV broadcasting station and a CATV terminal device in which the CATV terminal device inquires of the CATV broadcasting station the genre of each of a plurality of programs provided by the CATV broadcasting station, so that a response indicating the inquired genre of the program is sent to the CATV terminal device from the CATV broadcasting station, a CATV terminal device in a third two-way communication CATV system according to the present invention is characterized by comprising input means for inputting a genre which a viewer desires to view out of a plurality of genres, retrieving means for inquiring of the CATV broadcasting station the genre of each of the programs provided by the CATV broadcasting station when the genre which the viewer desires to view is input by the input means to retrieve a program corresponding to the genre input by the input means out of the programs provided by the CATV broadcasting station, and scanning means for switching a receiving channel so that the programs retrieved by the retrieving means are sequentially received for each predetermined time period.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a flow chart showing the procedure of processing for automatically setting a recognition number by a two-way service processing section in a hub;

DESCRIPTION OF THE PREFERRED EMBODIMENTS

Figure 1:
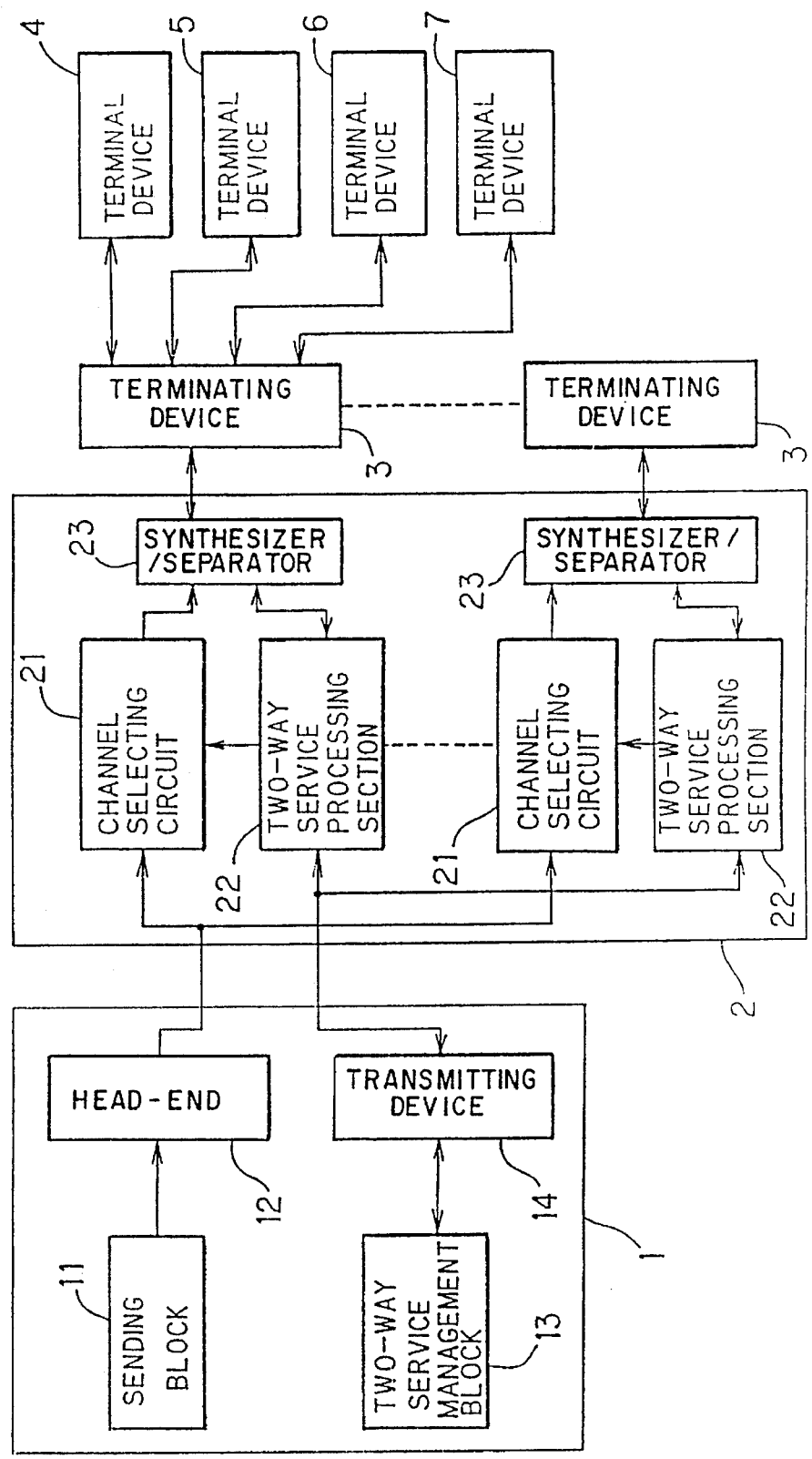
FIG. 1 is an electrical block diagram showing the schematic construction of a two-way communication CATV system employing a demand access method.

Referring now to the drawings, description is now made of an embodiment of the present invention.

FIG. 1 shows the schematic construction of a two-way communication CATV system employing a demand access method.

This system comprises a CATV broadcasting station 1, a hub 2, terminating devices 3, and CATV terminal devices 4 to 7. The CATV broadcasting station 1 and the hub 2, the hub 2 and the terminating device 3, and the terminating device 3 and the CATV terminal devices 4 to 7 are respectively connected to each other by optical cables.

The CATV broadcasting station 1 comprises a sending block 11, a head-end 12, a two-way service management block 13, and a transmitting device 14. The sending block 11 sends out television signals corresponding to a plurality of channels. The head-end 12 modulates the television signals corresponding to the plurality of channels for example, 40 channels) which are sent out from the sending block 11 respectively by different carriers and then, frequency-division-multiplexes waves to be modulated to generate a CATV broadcasting signal and send out the same. The two-way service management block 13 manages a two-way service. The transmitting device 14 sends and receives control data concerning the two-way service.

The hub 2 is a first relay device disposed between the CATV broadcasting station 1 and the terminating devices 3. The hub 2 comprises a plurality of sets each comprising a channel selecting circuit 21, a two-way service processing section 22 and a synthesizer/separator 23.

The sets each comprising the channel selecting circuit 21, the two-way service processing section 22 and the synthesizer/separator 23 respectively correspond to the different terminating devices 3. In addition, a maximum of four CATV terminal devices 4 to 7 are connected to each of the terminating devices 3. Furthermore, the four CATV terminal devices 4 to 7 connected to each of the terminating devices 3 are respectively assigned a different single channel out of channel 1, channel 5, channel 9 and channel 13 in a BS-IF band so as to allow receiving by a BS tuner. In this case, channel BS-1, channel BS-5, channel BS-9 and channel BS-13 are respectively assigned to the CATV terminal devices 4, 5, 6, and 7.

The two-way service processing section 22 receives channel request signals from the corresponding four CATV terminal devices 4 to 7, to control the channel selecting circuit 21 on the basis of the received channel request signals. Furthermore, the control data concerning the two-way service is exchanged between the CATV terminal devices 4 to 7 and the two-way service processing section 22. In addition, the control data concerning the two-way service is exchanged between the CATV broadcasting station 1 and the two-way service processing section 22.

The channel selecting circuit 21 first selects the broadcasting signals corresponding to the four channels requested by the respective CATV terminal devices 4 to 7 out of the broadcasting signals corresponding to 40 channels included in the CATV broadcasting signal on the basis of the channel request signals from the corresponding four CATV terminal devices 4 to 7. The channel selecting circuit 21 then respectively converts the frequencies of the selected broadcasting signals corresponding to the channels into the frequencies corresponding to the particular channels in the BS-IF band assigned to the corresponding CATV terminal device 4 to 7, and frequency-division-multiplexes the broadcasting signals whose frequencies are converted to generate a broadcasting multiple signal including the broadcasting signals corresponding to the four channels and send out the same.

The synthesizer/separator 23 synthesizes the broadcasting multiple signal sent out from the channel selecting circuit 21 and descending control data to be transmitted to the corresponding CATV terminal devices 4 to 7 to supply a synthetic signal obtained by the synthesis to the corresponding terminating device 3. In addition, the synthesizer/separator 23 separates ascending control data from the corresponding CATV terminal devices 4 to 7 to supply control data obtained by the separation to the two-way service processing section 22.

The terminating device 3 is a second relay device disposed between the hub 2 and the CATV terminal devices 4 to 7. Each of the terminating devices 3 separates the broadcasting multiple signal sent out from the hub 2 for the particular frequencies assigned to the four CATV terminal devices 4 to 7 and supplies broadcasting signals obtained by the separation to the corresponding CATV terminal devices 4 to 7. Consequently, the broadcasting signals corresponding to the channels requested by the CATV terminal devices 4 to 7 are respectively sent to the CATV terminal devices 4 to 7. The terminating device 3 also synthesizes and distributes the control data.

The CATV terminal devices 4 to 7 are respectively installed in subscribers' homes. Each of the CATV terminal devices 4 to 7 transmits to the hub 2 the channel request signal for designating one channel desired out of the 40 channels. Consequently, the frequencies of the broadcasting signals corresponding to the respective one channels desired out of the 40 channels are converted into frequencies corresponding to the particular channels (channel BS-1, channel BS-5, channel BS-9 and channel BS-13) assigned to the CATV terminal devices 4 to 7, and the broadcasting signals whose frequencies are converted are transmitted to the respective CATV terminal devices 4 to 7.

Recognition numbers are respectively set in the CATV terminal devices 4 to 7 so as to exchange the control data between the CATV broadcasting station 1 and the CATV terminal devices 4 to 7 and between the hub 2 and the CATV terminal devices 4 to 7. A method of setting the recognition numbers will be described later.

Figure 2:
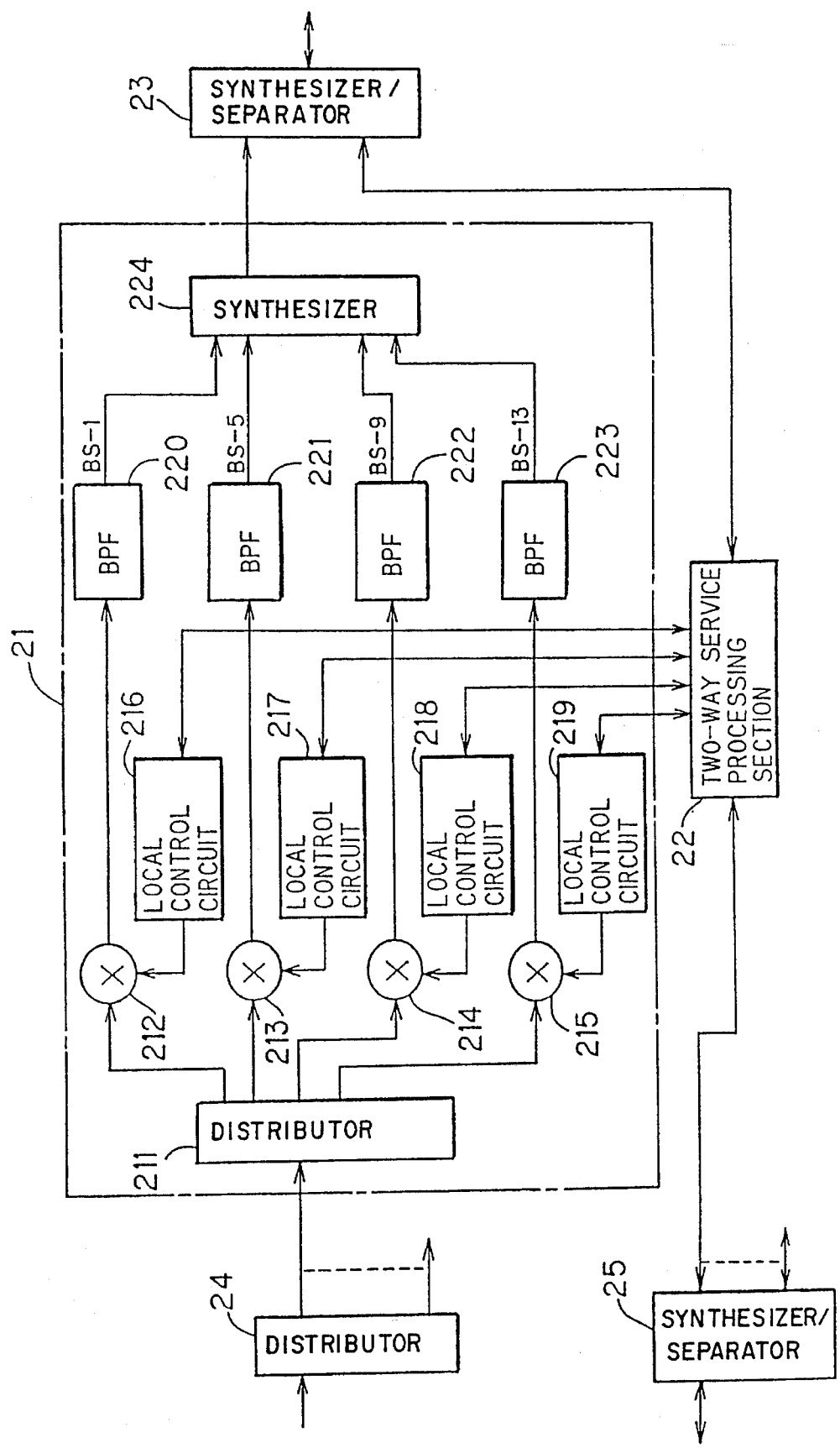
FIG. 2 is an electrical block diagram showing the detailed construction of a hub.

FIG. 2 shows the detailed construction of the hub 2. In FIG. 2, the channel selecting circuit 21, the two-way service processing section 22 and the synthesizer/separator 23 corresponding to one of the terminating devices 3 are shown.

The CATV broadcasting signal (a multiple signal including broadcasting signals corresponding to 40 channels) from the head-end 12 is distributed to a plurality of CATV broadcasting signals by a distributor 24. The CATV broadcasting signals output from the distributor 24 are respectively supplied to the different channel selecting circuits 21. The broadcasting signal (a multiple signal including broadcasting signals corresponding to 40 channels) supplied to the channel selecting circuit 21 is further distributed to four CATV broadcasting signals by a distributor 211. The CATV broadcasting signals (multiple signals each including broadcasting signals corresponding to 40 channels) output from the distributor 211 are respectively supplied to different mixers 212 to 215.

On the other hand, the two-way service processing section 22 supplies the channel request signals respectively transmitted from the four CATV terminal devices 4 to 7 to local control circuits 216 to 219 corresponding to the respective CATV terminal devices 4 to 7. Each of the local control circuits 216 to 219 comprises an oscillator whose oscillation frequency can be varied. In the respective local control circuits 216 to 219, the oscillation frequencies of the oscillators in the local control circuits 216 to 219 are controlled in response to the channel request signals sent from the two-way service processing section 22, and output signals of the oscillators are sent to the corresponding mixers 212 to 215. Specifically, the oscillation frequencies of the oscillators in the local control circuits 216 to 219 are controlled to be such frequencies as to convert the frequencies of the broadcasting signals corresponding to the channels requested by the corresponding CATV terminal devices into the frequencies corresponding to the BS channels (the frequencies in the BS-IF band) assigned to the CATV terminal devices.

The mixers 212 to 215 respectively convert the frequencies of the broadcasting signals corresponding to the channels requested by the corresponding CATV terminal devices into the frequencies corresponding to the BS channels assigned to the corresponding CATV terminal devices on the basis of the signals transmitted from the local control circuits 216 to 219. The broadcasting signals output from the mixers 212 to 215 are respectively supplied to BPFs (bandpass filters) 220 to 223 for passing only frequency components in frequency bands corresponding to the BS channels assigned to the corresponding CATV terminal devices and then, are synthesized by a synthesizer 224.

Specifically, the frequencies of the broadcasting signals corresponding to the respective channels requested by the four CATV terminal devices 4 to 7 are respectively converted into the frequencies corresponding to the BS channels assigned to the CATV terminal devices which send the requests. The four broadcasting signals having the frequencies corresponding to channel BS-1, channel BS-5, channel BS-9 and channel BS-13 are synthesized. A broadcasting multiple signal obtained by the synthesis and descending control data are synthesized by the synthesizer/separator 23, and a synthetic signal obtained by the synthesis is transmitted to the corresponding terminating device 3.

Each of the two-way service processing sections 22 in the hub 2 is connected to the transmitting device 14 in the CATV broadcasting station 1 through a synthesizer/distributor 25. The synthesizer/distributor 25 synthesizes ascending control data from the two-way service processing sections 22 in the hub 2 to supply a synthetic signal obtained by the synthesis to the transmitting device 14 in the CATV broadcasting station 1, and distributes descending control data from the two-way service block 13 in the CATV broadcasting station 1 to supply control data obtained by the distribution to the two-way service processing sections 22 in the hub 2.

Figure 3:
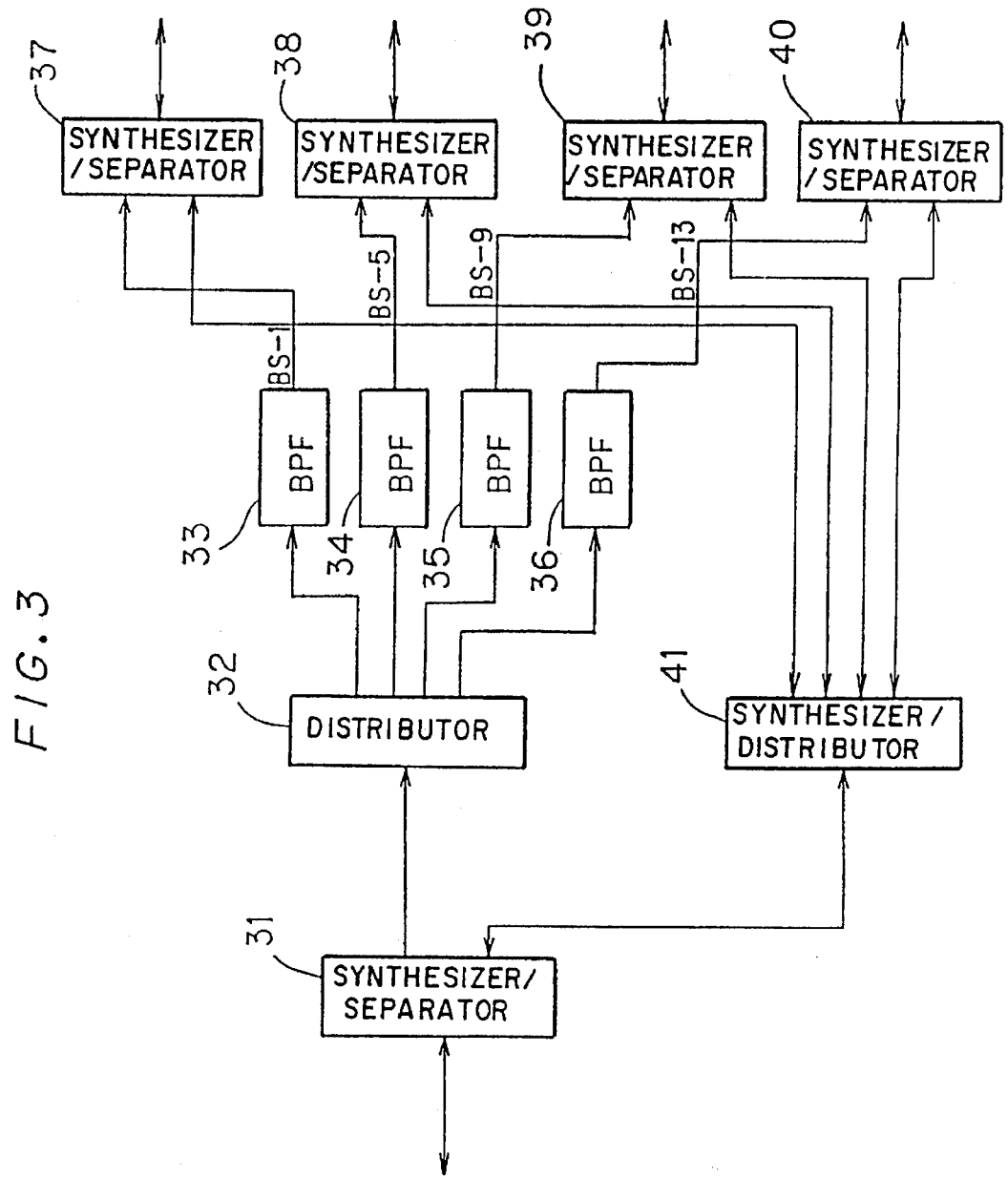
FIG. 3 is an electrical block diagram showing the detailed construction of a terminating device.

FIG. 3 shows the detailed construction of the terminating device 3. The signal transmitted from the hub 2 is first separated into a broadcasting multiple signal including broadcasting signals corresponding to four channels and descending control data by a synthesizer/separator 31. The broadcasting multiple signal output from the synthesizer/separator 31 is distributed to four broadcasting multiple signals by a distributor 32. The broadcasting multiple signals output from the distributor 32 are separately supplied to BPFs 33, 34, 35 and 36 for respectively passing only frequency components corresponding to channel BS-1, channel BS-5, channel BS-9 and channel BS-3. The broadcasting signals passed through the BPFs 33 to 36 are respectively supplied to synthesizers/separators 37 to 40 in the succeeding stages of the BPFs 33 to 36. On the other hand, the descending control data output from the synthesizer/separator 31 is distributed to four control data by a synthesizer/distributor 41. The four control data output from the synthesizer/distributor 41 are separately supplied to the four synthesizers/separators 37 to 40, and the four control data and the broadcasting signals supplied to the synthesizers/separators 37 to 40 are synthesized. Outputs of the synthesizers/separators 37 to 40 are supplied to the corresponding CATV terminal devices 4 to 7. Consequently, the broadcasting signals supplied to respective CATV terminal devices 4 to 7 become broadcasting signals having frequencies corresponding to the different BS channels.

The ascending control data sent to the terminating device 3 from the respective CATV terminal devices 4 to 7 are separated by the corresponding synthesizers/separators 37 to 40 and then, are synthesized by the synthesizer/distributor 41. A synthesis signal of the control data which is output from the synthesizer/distributor 41 is supplied to the hub 2 through the synthesizer/separator 31.

Figure 4:
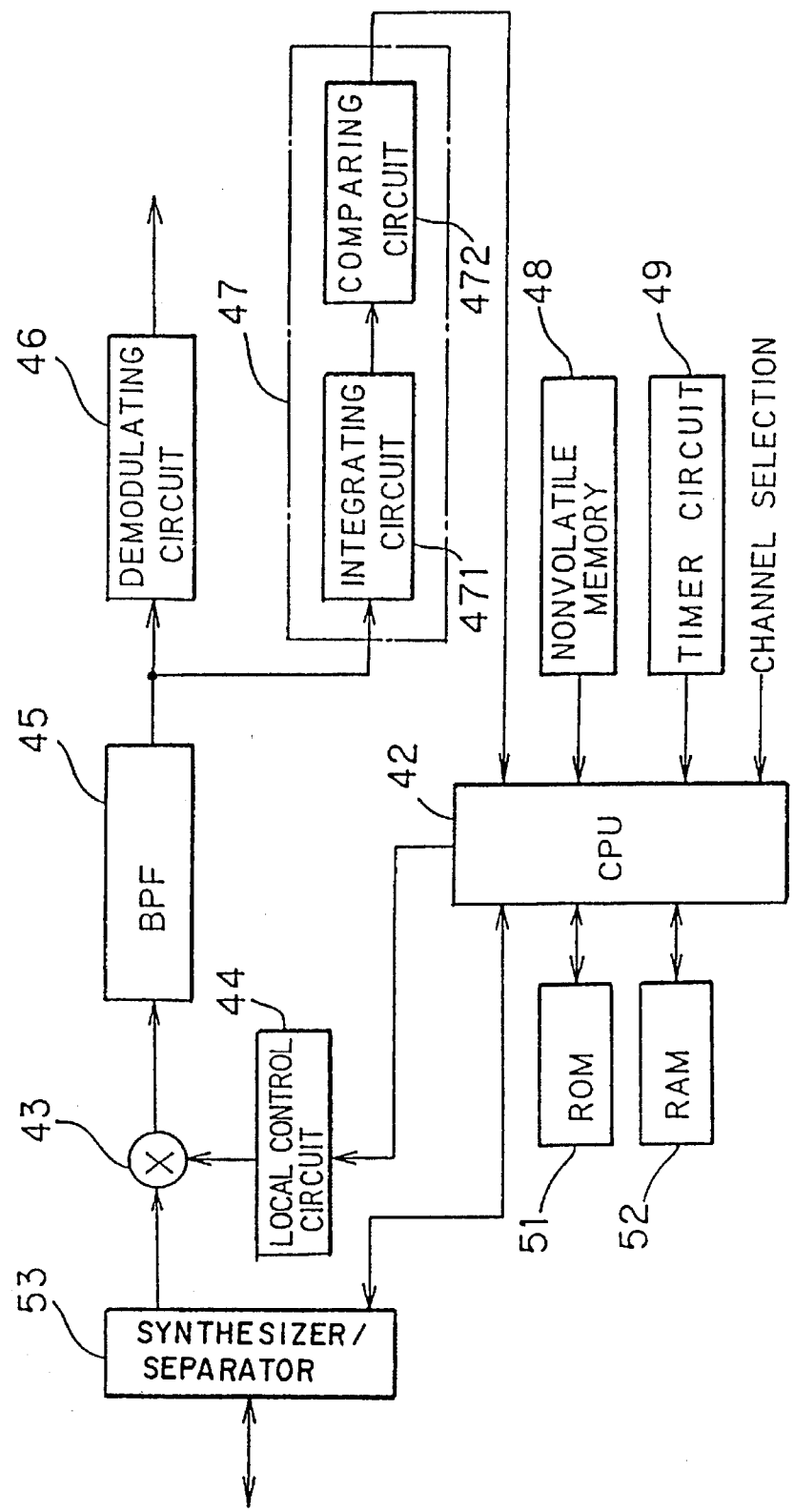
FIG. 4 is an electrical block diagram showing the detailed construction of a CATV terminal device.

FIG. 4 shows the details of the CATV terminal device. The respective CATV terminal devices 4 to 7 are of the same construction and hence, description is now made of the CATV terminal device 4 assigned channel BS-1.

A synthesizer/separator 53 separates the signal from the terminating device 3 into descending control data and a broadcasting signal, and sends out the ascending control data to a communication line between the terminating device 3 and the CATV terminal device 4. A CPU 42 controls respective equipment in the CATV terminal device 4, and communicates the control data to the two-way service management block 13 in the CATV broadcasting station 1 or the two-way service processing section 22 in the hub 2. The CPU 42 comprises a ROM 51 storing its program or the like, a RAM 52 storing necessary data, a nonvolatile memory 48 storing, for example, a recognition number assigned to the CATV terminal device 4, and a timer circuit 49 used in, for example, accomplishing timer-recording.

A local control circuit 44 comprises an oscillator whose oscillation frequency can be varied, and outputs a control signal to a mixer 43 on the basis of a BS channel selection signal from the CPU 42. At the normal time, a channel selection signal corresponding to the channel BS-1 is output from the CPU 42. Furthermore, at the normal time, the mixer 43 converts the frequency of a broadcasting signal corresponding to the channel BS-1 into a predetermined intermediate frequency on the basis of the control signal sent from the local control circuit 44. A BPF 45 is a filter for passing only a signal in a predetermined intermediate frequency band. A demodulating circuit 46 demodulates the signal having the intermediate frequency output from the mixer 43 and passed through the BPF 45, to generate a television signal. This television signal is sent to a television (not shown). The mixer 43, the BPF 45, and the demodulating circuit 46 respectively have the same structures as a channel selecting circuit and a demodulating circuit provided for a known BS tuner.

A judging or determining circuit 47 determines whether or not the signal having the predetermined intermediate frequency is output from the BPF 45. The determining circuit 47 comprises an integrating circuit 471 for integrating the output of the BPF 45 and a comparing circuit 472 for comparing an output of the integrating circuit 471 with a predetermined threshold value.

In the above described construction, if a subscriber possessing the CATV terminal device 4 selects desired one channel out of the 40 channels using a remote controller 60 (see FIG. 11), a channel selection signal indicating the selected channel is supplied to the CPU 42. A channel request signal for requesting the channel selected by the channel selection signal is output as ascending control data from the CPU 42. This control data is transmitted to the two-way service processing section 22 in the hub 2 through the synthesizer/separator 53 and the terminating device 3.

The channel request signal sent to the two-way service processing section 22 is sent to the channel selecting circuit 21. In the channel selecting circuit 21, the frequency of only a broadcasting signal corresponding to the channel requested on the basis of the sent channel request signal is converted into the frequency corresponding to the channel BS-1. The broadcasting signal whose frequency is converted into the frequency corresponding to the channel BS-1 is sent to the CATV terminal device 4 from the terminating device 3.

The broadcasting signal sent to the CATV terminal device 4 is sent to the mixer 43 through the synthesizer/separator 53. In the mixer 43, the sent broadcasting signal is converted into a signal having a predetermined intermediate frequency. The signal having an intermediate frequency output from the mixer 43 is sent to the demodulating circuit 46 through the BPF 45, and a television signal corresponding to the channel requested by the subscriber is obtained from the demodulating circuit 46.

Figure 5:
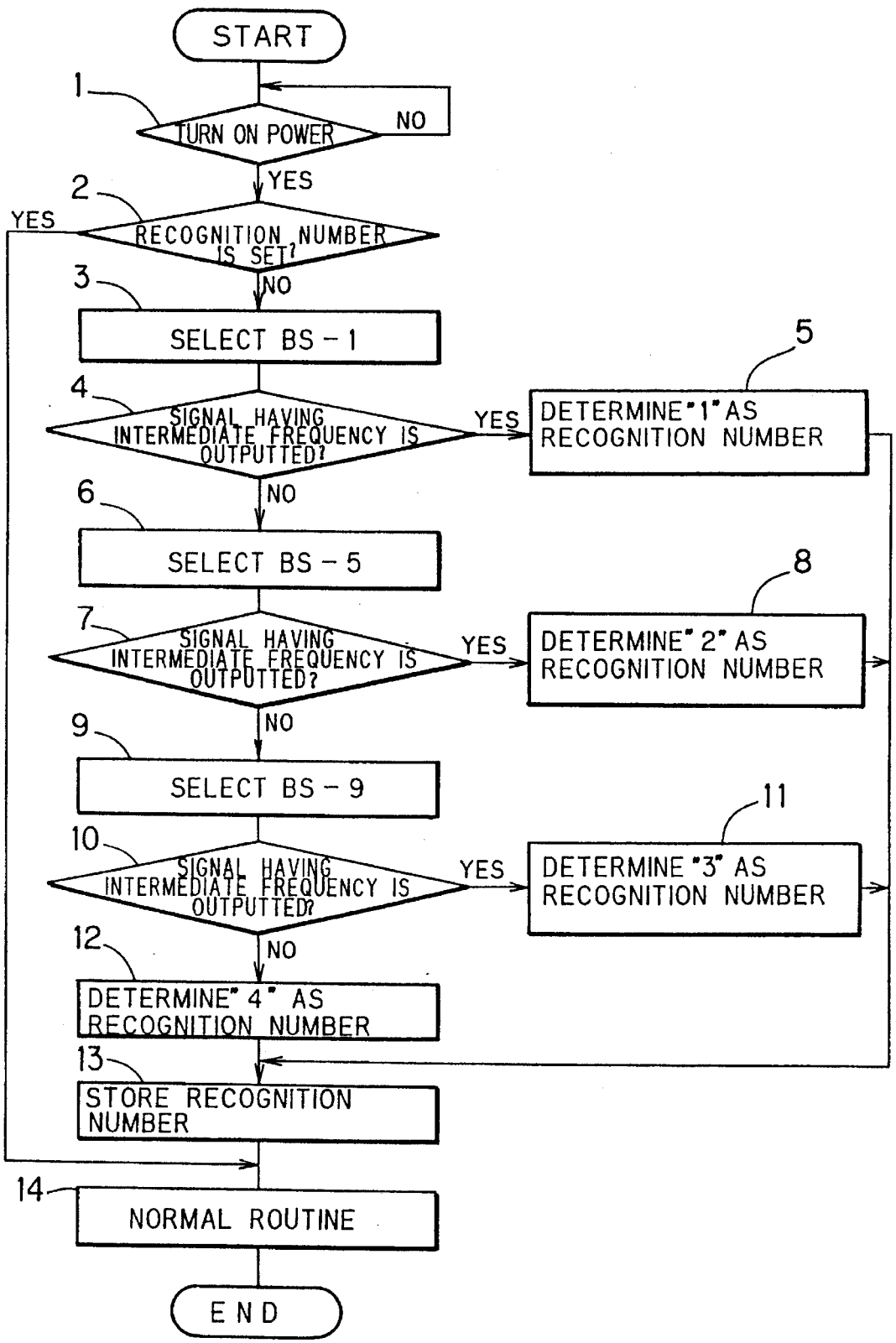
FIG. 5 is a flow chart showing the procedure of processing for automatically setting a recognition number by a CPU in the CATV terminal device.

FIG. 5 shows the procedure of processing for automatically setting, when one CATV terminal device is newly subscribed in one home, a recognition number assigned to the newly subscribed CATV terminal device.

The recognition number assigned to the CATV terminal device is determined by a communication path as viewed from the CATV broadcasting station 1. Specifically, a high-order digit of the recognition number is determined depending on which of hubs 2 is a hub through which the communication path as viewed from the CATV broadcasting station 1 passes. In addition, an intermediate-order digit of the recognition number is determined depending on which of the terminating devices 3 is a terminating device through which the communication path as viewed from the CATV broadcasting station 1 passes. Furthermore, a lower-order digit of the recognition number is determined depending on which of the output terminals in the terminating device 3 is an output terminal through which the communication path as viewed from the CATV broadcasting station passes.

If a CATV terminal device is newly subscribed, a terminating device 3 to which the newly subscribed CATV terminal device is connected is determined, so that the upper-order digit and the intermediate-order digit of a recognition number assigned to the newly subscribed CATV terminal device are determined. Consequently, only the lower-order digit of the recognition number assigned to the newly subscribed CATV terminal device may be determined. Although the recognition number assigned to the CATV terminal device is represented by three figures, the CATV terminal device may only recognize only the lower-order digit of the recognition number. In the following, a word "recognition number" is used in the sense of a lower digit of the recognition number.

Processing for automatically setting a recognition number assigned to a CATV terminal device is performed by a CPU 42 in the CATV terminal device. The processing for automatically setting a recognition number assigned to a CATV terminal device is performed when the CATV terminal device is installed and the power is first applied to the CATV terminal device.

When the newly subscribed CATV terminal device is installed, the CATV broadcasting station 1 recognizes a terminating device 3 to which the newly installed CATV terminal device is connected, and a two-way service processing section 22 connected to the terminating device 3 and a hub 2 to which the two-way service processing section 22 belongs. The CATV broadcasting station 1 issues instructions to the two-way service processing section 22 so that a predetermined channel request signal is sent from the two-way service processing section 22 to the local control circuits where no CATV terminal device is installed out of the four local control circuits 216 to 219 controlled by the two-way service processing section 22 which communicates with the newly installed CATV terminal device. Consequently, broadcasting signals having frequencies corresponding to the BS channels determined for each mixer are output from the mixers where no CATV terminal device is installed out of the mixers 212 to 215.

Description is now made of processing for automatically setting a recognition number assigned to a CATV terminal device on the basis of the foregoing premise. When a newly subscribed CATV terminal device is installed and then, the power supply is turned on (step 1), it is determined whether or not a recognition number is stored in the memory 48 (step 2). If the recognition number is stored in the memory 48, a normal routine is implemented (step 14).

If the recognition number is not stored in the memory 48, the recognition number automatic setting processing is started. Specifically, a channel selection signal corresponding to channel BS-1 is sent to the local control circuit 44 from the CPU 42 (step 3). It is determined whether or not a signal having an intermediate frequency is received on the basis of an output of the determining circuit 47 (step 4).

If the channel selection signal corresponding to the channel BS-1 is sent to the local control circuit 44 in the foregoing step 3, a control signal for converting a signal having a frequency corresponding to the channel BS-1 into a signal having a predetermined intermediate frequency is sent to the mixer 43 from the local control circuit 44. When a broadcasting signal input to the mixer 43 is a broadcasting signal having a frequency corresponding to the channel BS-1, a signal having an intermediate frequency is output from the BPF 45, so that the inquiry is answered in the affirmative in the foregoing step 4. When the broadcasting signal input to the mixer 43 is a signal having a frequency corresponding to a channel other than the channel BS-1, no signal having an intermediate frequency is output from the BPF 45, so that the inquiry is answered in the negative in the foregoing step 4.

If the inquiry is answered in the affirmative in the foregoing step 4, it is determined that the BS channel assigned to the CATV terminal device is the channel BS-1, so that a recognition number "1" corresponding to the channel BS-1 is determined as a recognition number assigned to the CATV terminal device (step 5), and the determined recognition number is stored in the memory 48 (step 13). Thereafter, the program proceeds to the normal routine (step 14).

If the inquiry is answered in the negative in the foregoing step 4, the BS channel assigned to the CATV terminal device has not been known yet, so that a channel selection signal corresponding to channel BS-5 is sent to the local control circuit 44 from the CPU 42 (step 6). It is determined on the basis of an output of the determining circuit 47 whether or not a signal having an intermediate frequency is received (step 7).

Since the channel selection signal corresponding to the channel BS-5 is sent to the local control circuit 44, a signal having an intermediate frequency is output from the BPF 45 when a broadcasting signal having a frequency corresponding to the channel BS-5 is input to the mixer 43. As a result, the inquiry is answered in the affirmative in the foregoing step 7. In this case, it is determined that the BS channel assigned to the CATV terminal device is the channel BS-5, so that a recognition number "2" corresponding to the channel BS-5 is determined as a recognition number assigned to the CATV terminal device (step 8), and the determined recognition number is stored in the memory 48 (step 13). The program then proceeds to the normal routine (step 14).

When a broadcasting signal having a frequency corresponding to a channel other than the channel BS-5 is input to the mixer 43, no signal having an intermediate signal is output from the BPF 45, so that the inquiry is answered in the negative in the foregoing step 7. In this case, the BS channel assigned to the CATV terminal device has not been known yet, so that a channel selection signal corresponding to channel BS-9 is sent to the local control circuit 44 from the CPU 42 (step 9). It is determined on the basis of an output of the determining circuit 47 whether or not a signal having an intermediate frequency is received (step 10).

Since the channel selection signal corresponding to the channel BS-9 is sent to the local control circuit 44, a signal having an intermediate frequency is output from the BPF 45 when a broadcasting signal having a frequency corresponding to the channel BS-9 is input to the mixer 43. As a result, the inquiry is answered in the affirmative in the foregoing step 10. In this case, it is determined that the BS channel assigned to the CATV terminal device is the channel BS-9, so that a recognition number "3" corresponding to the channel BS-9 is determined as a recognition number assigned to the CATV terminal device (step 11), and the determined recognition number is stored in the memory 48 (step 13). The program then proceeds to the normal routine (step 14).

When a broadcasting signal having a frequency corresponding to a channel other than the channel BS-9 is input to the mixer 43, no signal having an intermediate frequency is output from the BPF 45, so that the inquiry is answered in the negative in the foregoing step 10. In this case, it is determined that the BS channel assigned to the CATV terminal device is the remaining channel, that is, channel BS-13, so that a recognition number "4" corresponding to the channel BS-13 is determined as a recognition number assigned to the CATV terminal device (step 12), and the determined recognition number is stored in the memory 48

(step 13). The program then proceeds to the normal routine (step 14).

According to the above described recognition number automatic setting processing, when a newly subscribed CATV terminal device is installed, a recognition number assigned to the CATV terminal device is automatically set. Therefore, a plurality of types of CATV terminal devices need not be manufactured for each recognition number, thereby to make it easy to manage products. In addition, the setting of a recognition number becomes simpler, as compared with the conventional device for setting a recognition number by a DIP switch.

Description is now made of a method in which even when not less than two CATV terminal devices are installed in one home, a recognition number assigned to each of the CATV terminal devices can be automatically set.

Figure 6:
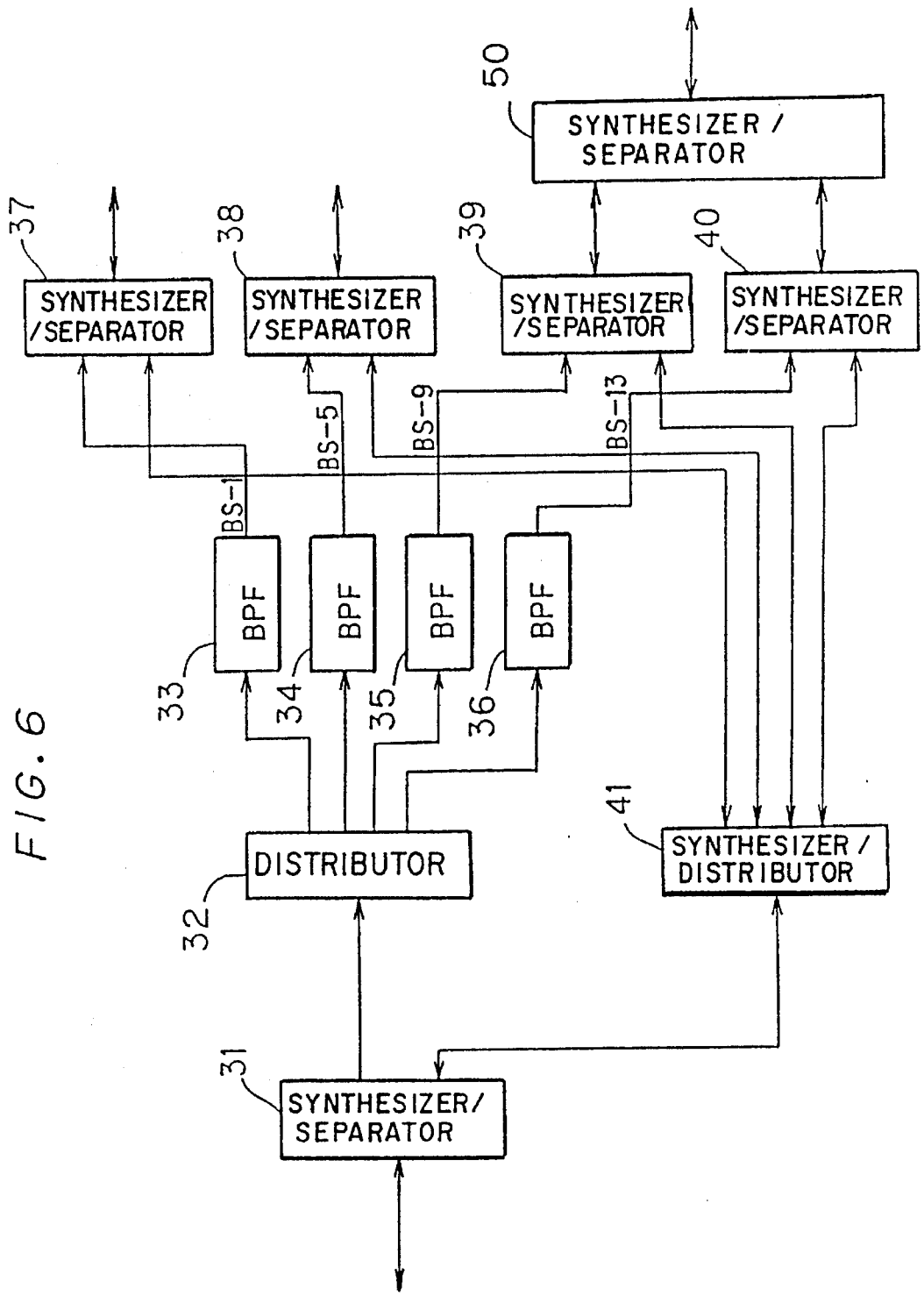
FIG. 6 is an electrical block diagram showing a state where a synthesizer/separator 50 is added to the terminating device shown in FIG. 3 when two CATV terminal devices are installed in one home.

FIG. 6 shows a state where a synthesizer/separator 50 is added to the terminating device 3 in a case where two CATV terminal devices are installed in one home. In FIG. 6, the same portions as those shown in FIG. 3 are assigned the same reference numerals and hence, the description thereof is omitted. Suppose the CATV terminal devices 4 and 5 corresponding to the synthesizers/separators 37 and 38 have been already installed of the synthesizers/separators 37 to 40 in the terminating device 3, and the CATV terminal devices corresponding to the synthesizers/separators 39 and 40 have not been installed yet. Both the two CATV terminal devices corresponding to the synthesizers/separators 39 and 40 are newly installed in one home.

A recognition number "1" corresponding to channel BS-1 is set in the CATV terminal device 4 (see FIG. 1) connected to the synthesizer/separator 37, and a recognition number "2" corresponding to channel BS-5 is set in the CATV terminal device 5 connected to the synthesizer/separator 37. Consequently, a recognition number "3" or "4" other than "1" and "2" must be assigned to the two CATV terminal devices newly installed.

When both the two CATV terminal devices corresponding to the synthesizers/separators 39 and 40 are newly installed in one home, outputs of the synthesizer/separator 39 and the synthesizer/separator 40 are synthesized by the other synthesizer/separator 50, and a synthetic signal obtained by the synthesis is sent to the home where the two CATV terminal devices are newly installed though one cable. Consequently, a multiple broadcasting signal obtained by multiplexing a signal having a frequency corresponding to channel BS-9 and a signal having a frequency corresponding to channel BS-13 is sent to the two CATV terminal devices newly installed. In a method of setting a recognition number described using FIG. 5, therefore, it is impossible to determine the recognition number.

Figure 7A:
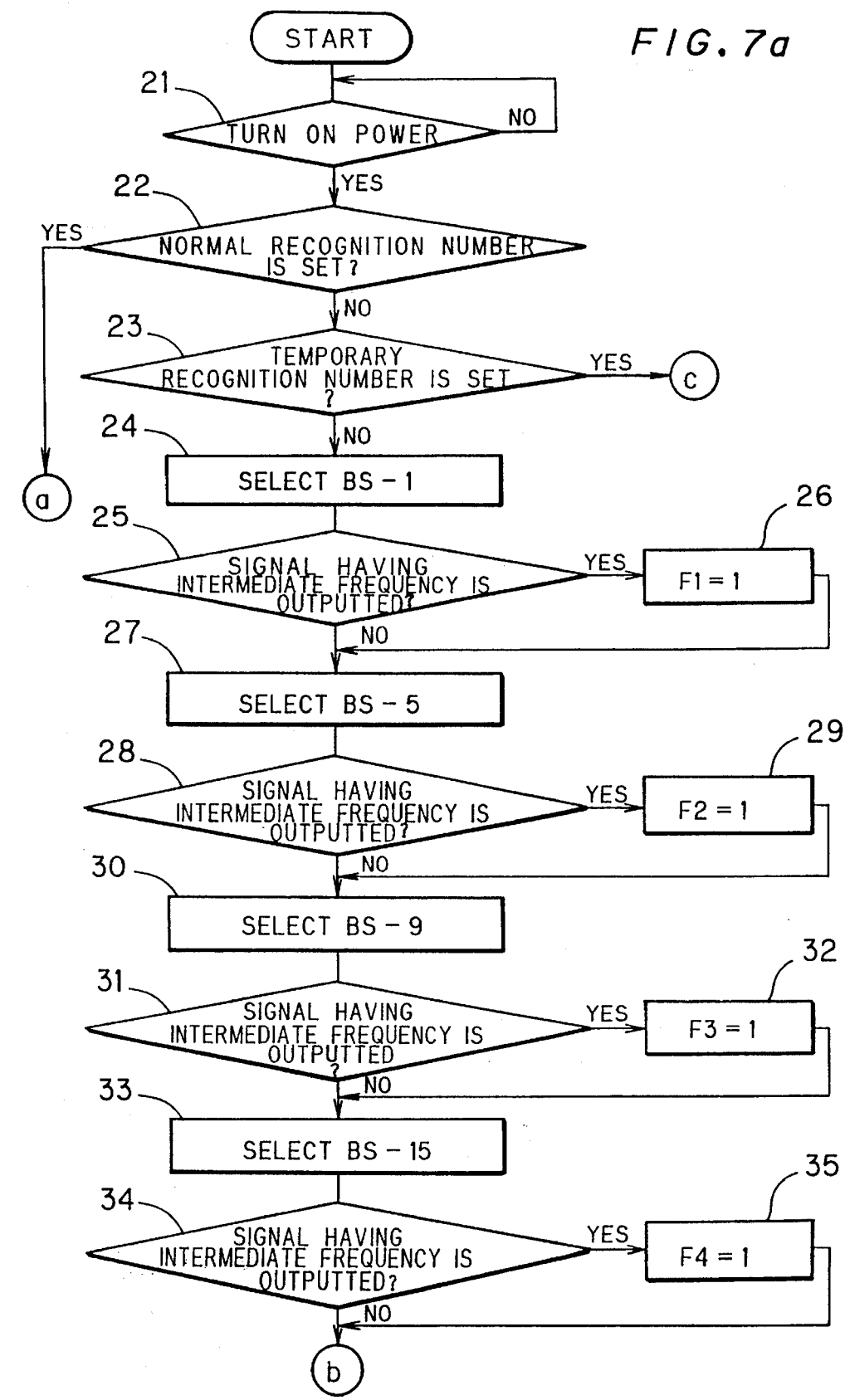
FIGS. 7a–7b are is a flow chart showing the procedure of processing for automatically setting a recognition number by a CPU in a CATV terminal device.
Figure 7B:
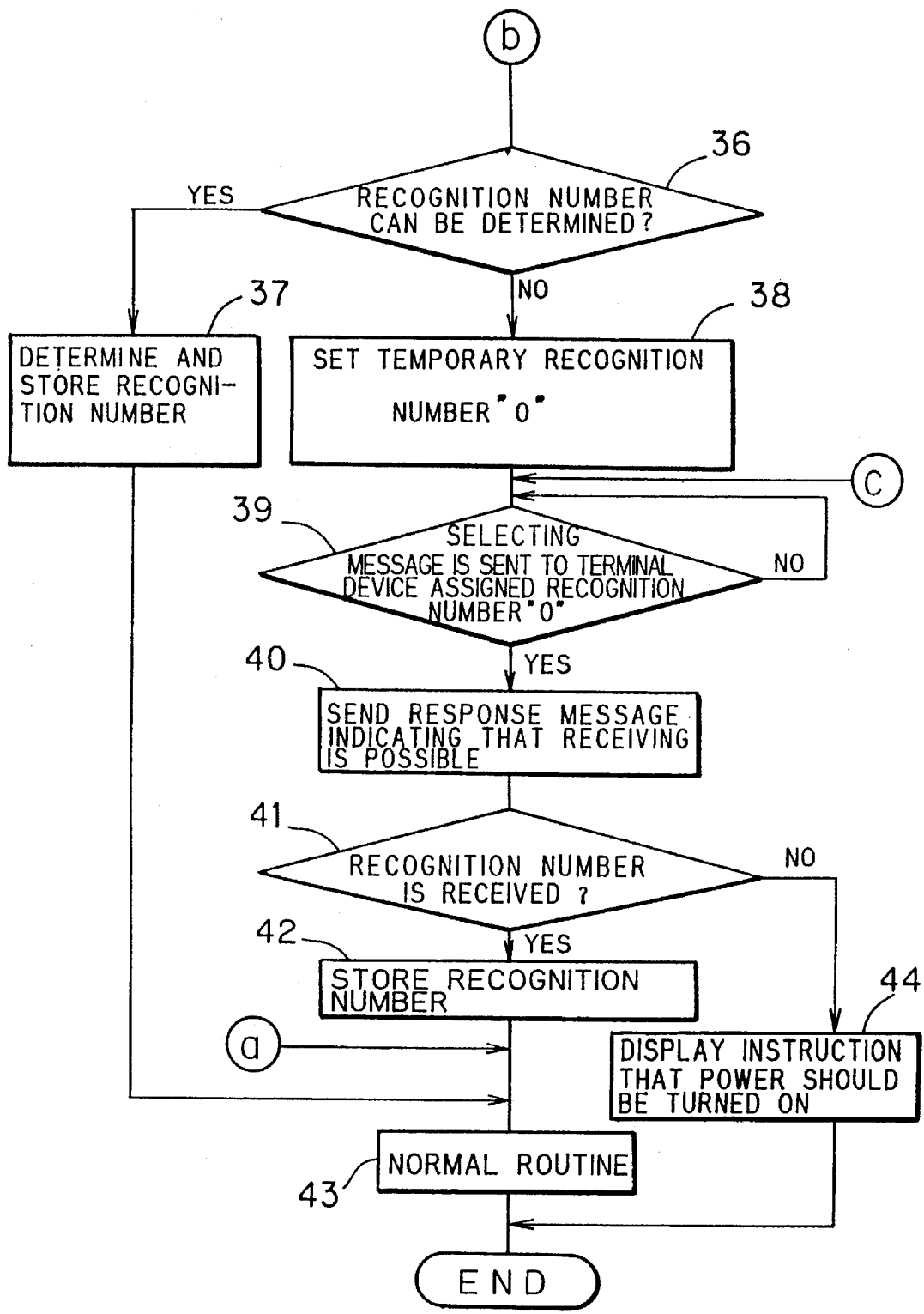

FIGS. 7(a)–7(b) and 8 show the procedure of recognition number automatic setting processing in which a recognition number assigned to a newly subscribed CATV terminal device can be automatically set even if not less than two CATV terminal devices are installed in one home.

FIGS. 7(a)–7(b) show processing performed by a CPU 42 in the newly subscribed CATV Terminal device, and FIG. 8 shows processing for automatically setting a recognition number by the two-way service processing section 22 see FIG. 2) serving as a communication control station which communicates with the newly subscribed CATV terminal device.

If the newly subscribed CATV terminal device is installed and the power supply is turned on (step 21), it is determined whether or not normal recognition numbers "1" to "4" are stored in the memory 48 (step 22). If the normal recognition numbers are stored in the memory 48, the program proceeds to the step 43. In the step 43, a normal routine is implemented.

If the normal recognition numbers are not stored in the memory 48, it is determined whether or not a temporary recognition number other than the normal recognition numbers "1" to "4", for example, "0" is stored in the memory 48 (step 23). If the temporary recognition number "0" is stored, the program proceeds to the step 39. If the temporary recognition number "0" is not stored, recognition number automatic setting processing in the first stage in the steps 23 to 37 is performed.

In the recognition number automatic setting processing in the first stage, a channel selection signal corresponding to channel BS-1, a channel selection signal corresponding to channel BS-5, a channel selection signal corresponding to channel BS-9 and a channel selection signal corresponding to channel BS-13 are sequentially sent to the local control circuit 44 (steps 24, 27, 30 and 33). Every time the channel selection signal corresponding to each of the channels is sent to the local control circuit 44, it is determined on the basis of an output of the judging circuit 47 whether or not a signal having an intermediate frequency is received (steps 25, 28, 31 and 34).

When it is determined in the foregoing step 25 that the signal having an intermediate frequency is received, a first flag F1 indicating that a broadcasting signal having a frequency corresponding to the channel BS-1 is sent to the CATV terminal device is set (F1=1) (step 26). If it is determined in the foregoing step 28 that the signal having an intermediate frequency is received, a second flag F2 indicating that a broadcasting signal having a frequency corresponding to the channel BS-5 is sent to the CATV terminal device is set (F2=1) (step 29).

If it is determined in the foregoing step S31 that the signal having an intermediate frequency is received, a third flag F3 indicating that a broadcasting signal having a frequency corresponding to the channel BS-9 is sent to the CATV terminal device is set (F3=1) (step 32). When it is determined in the foregoing step 34 that the signal having an intermediate frequency is received, a fourth flag F4 indicating that a broadcasting signal having a frequency corresponding to the channel BS-15 is sent to the CATV terminal device is set (F4=1) (step 35).

It is determined on the basis of the state of each of the flags whether or not the recognition number can be determined step S36). Specifically, when only one of the four flags F1 to F4 is set, it is determined that the recognition number can be determined, so that the program proceeds to the step 37. In the step 37, a normal recognition number corresponding to the set flag is stored in the memory 48 and then, the program proceeds to the normal routine in the step 43.

When one newly subscribed CATV terminal device is newly installed in one home, a state occurs where only one of the four flags F1 to F4 is set and the other flags are not set in the above described recognition number automatic setting processing in the first stage. Consequently, the inquiry is answered in the affirmative in the foregoing step 36, so that a normal recognition number is determined.

When a state does not occur where only one of the four flags F1 to F4 is set, it is determined in the foregoing step 36 that the recognition number cannot be determined. When not less than two newly subscribed CATV terminal devices are newly installed in one home, a plurality of flags out of the four flags are set in the above described recognition number automatic setting processing in the first stage. Consequently, the inquiry is answered in the negative in the foregoing step 36. If the inquiry is answered in the negative in the step 36, the program proceeds to the step 38. In the step 38, the temporary recognition number "0" is stored in the memory 48. Recognition number automatic setting processing in the second stage in the step 39 and the subsequent steps is then performed. The reason why a temporary recognition number is set in a case where a recognition number is not thus determined in the recognition number automatic setting processing in the first stage is as follows. Specifically, if two newly subscribed CATV terminal devices are newly installed in one home, any recognition number must be assigned to each of the CATV terminal devices in order for the two-way service processing section 22 serving as a communication control station corresponding to the CATV terminal devices to communicate with the CATV terminal devices. Therefore, a temporary recognition number is set in each of the CATV terminal devices newly subscribed as described above, thereby to allow communication between the CATV terminal devices and the two-way service processing section 22.

Description is now made of the recognition number automatic setting processing in the second state and processing performed by the two-way service processing section 22 shown in FIG. 8.

The two-way service processing section 22 always executes a normal routine (step 51). If the two-way service processing section 22 receives from the two-way service block 13 in the CATV broadcasting station 1 information on new installation indicating that a plurality of newly subscribed CATV terminal devices, that is, two newly subscribed CATV terminal devices in this example are newly installed in one home (step 52), it sends a selecting message to a CATV terminal device assigned a recognition number "0" (step 53). Consequently, a selecting message is sent to two newly subscribed CATV terminal devices in which the temporary recognition number "0" is set. The above described information on new installation also includes information on recognition numbers "3" and "4" to be assigned to the two newly subscribed CATV terminal devices.

Selecting means informing a CATV terminal device assigned a particular recognition number that there is information to be sent from the two-way service processing section 22 as well as inquiring of the CATV terminal device a state where the CATV terminal device is preparing for receiving.

When each of the newly subscribed CATV terminal devices receives the selecting message from the two-way service processing section 22 (step 39), it transmits to the two-way service processing section 22 a response message indicating that receiving is possible (step 40).

When the two-way service processing section 22 receives from one of the two newly subscribed CATV terminal devices a normal response message indicating that receiving is possible (step 54), it transmits a normal recognition number "3" to the CATV terminal device from which the response message indicating that receiving is possible is transmitted (step 55). Furthermore, the two-way service processing section 22 transmits to the two-way service block 13 in the CATV broadcasting station 1 information indicating that the setting of a recognition number in one CATV terminal device is completed and information on the recognition number "3" assigned to the CATV terminal device (step 55).

When the CATV terminal device receives the recognition number "3" transmitted from the two-way service processing section 22 (YES in the step 41), it stores the received recognition number "3" as a normal recognition number in the memory 48 (step 42). The program then proceeds to the step 43. In the step 43, a normal routine is implemented.

After the two-way service processing section 22 performs the processing in the step 55, the program is returned to the step 51. In the step 51, the normal routine is implemented. If the two-way service processing section 22 receives from the two-way service block 13 in the CATV broadcasting station 1 information on new installation indicating that the setting of recognition numbers in all newly installed CATV terminal devices is not completed (step 52), it sends a selecting message again to a CATV terminal device assigned a recognition number "0" (step 53). Consequently, a selecting message is sent to the remaining one CATV terminal device in which the temporary recognition number "0" is set. The above described information on new installation also includes information on a recognition umber "4" to be assigned to the remaining one CATV terminal device.

When the two-way service processing section 22 receives from the CATV terminal device a normal response message indicating that receiving is possible (step 54), it transmits the recognition number "4" to the remaining one CATV terminal device from which the response message indicating that receiving is possible is transmitted (step 55). Furthermore, the two-way service processing section 22 transmits to the two-way service block 13 in the CATV broadcasting station 1 information indicating that the setting of a recognition number in one CATV terminal device is completed and information on the recognition number "4" assigned to the CATV terminal device. The program is then returned to the step 51. In the step 51, the normal routine is implemented.

When the CATV terminal device receives the recognition number "4" transmitted from the two-way service processing section 22 (YES in the step 41), it stores the received recognition number "4" as a normal recognition number in the memory 48 (step 42). The program then proceeds to the step 43. In the step 43, the normal routine is implemented.

If the two-way service processing section 22 cannot receive the normal response message from the CATV terminal device with respect to the selecting message in the foregoing step 53, it transmits information indicating that the response is abnormal to the CATV terminal device to which the selecting message is transmitted (step 56). The program is then returned to the step 51. In the step 51, the normal routine is implemented. Thereafter, if the two-way terminal processing section 22 receives the information on new installation from the two-way service block 13 in the CATV broadcasting station 1, it sends a selecting message again to a CATV terminal device assigned a recognition number "0".

Examples of a case where a normal response message cannot be received include a case where not less than two response signals are received within a defined time period, a case where a response signal cannot be received as a defined response signal because it is disturbed by collision, and a case where a response signal cannot be received within a defined time period.

When the CATV terminal device receives from the two-way service processing section 22 the information indicating that the response is abnormal (NO in the step 41), an instruction that a user should turn the power supply on again is displayed on a display section (not shown) provided for the CATV terminal device (step 44). When the power supply is turned on again by this display, the inquiry is answered in the negative in the step 22 and the inquiry is answered in the affirmative in the step 23, so that the program proceeds to the step 39. In the step 39, the CATV terminal device waits for a selecting message. Thereafter, when the CATV terminal device receives the selecting message, it transmits a response message indicating that receiving is possible to the two-way service processing section 22. Consequently, a recognition number is assigned to the CATV terminal device from the two-way service processing section 22.

When the CATV terminal device receives from the two-way service processing section 22 the information indicating that the response is abnormal (NO in the step 41), it may wait for a selecting message in the step 39 after generating a random number to stop the operation during a time period corresponding to the random number.

When two CATV terminal devices are installed in one home, a recognition number can be automatically set in the same manner whether the two CATV terminal devices are simultaneously installed or one of the CATV terminal devices is first installed and then, the other CATV terminal device is installed.

Meanwhile, programs provided from the CATV broadcasting station 1 in the two-way communication CATV system as shown in FIG. 1 include a chargeable program. When a channel broadcasting this chargeable broadcasting program is selected by the CATV terminal device, the contents of the broadcasting are provided without charge for a predetermined time period (cleaning time) after selecting the channel in order to make a viewer determine whether to view the chargeable broadcasting program. If the viewer wishes to view the chargeable broadcasting program, the viewer must inform the CATV broadcasting station 1 (see FIG. 1) of the intention to view the chargeable broadcasting program by operating a remote controller within the cleaning time. If the viewer does not perform this operation within the cleaning time, an image is scrambled after the cleaning time is terminated.

On the other hand, in the two-way communication CATV system as shown in FIG. 1, when a normal program other than the chargeable broadcasting program is timer-recorded by a VTR, time and a channel are set in a timer in a CATV terminal device, and the same time is set in a timer in the VTR. Consequently, the CATV terminal device and the VTR are simultaneously operated at the set time, thereby to make it possible to record a program which is broadcasted on the set channel.

Even if the viewer attempts to timer-record the chargeable broadcasting program in a method of timer-recording a normal broadcasting program, however, the viewer cannot inform the CATV broadcasting station 1 of the intention to view the chargeable broadcasting program within the cleaning time. Therefore, the chargeable broadcasting program cannot be normally timer-recorded in the method of timer-recording a normal broadcasting program.

Figure 9:
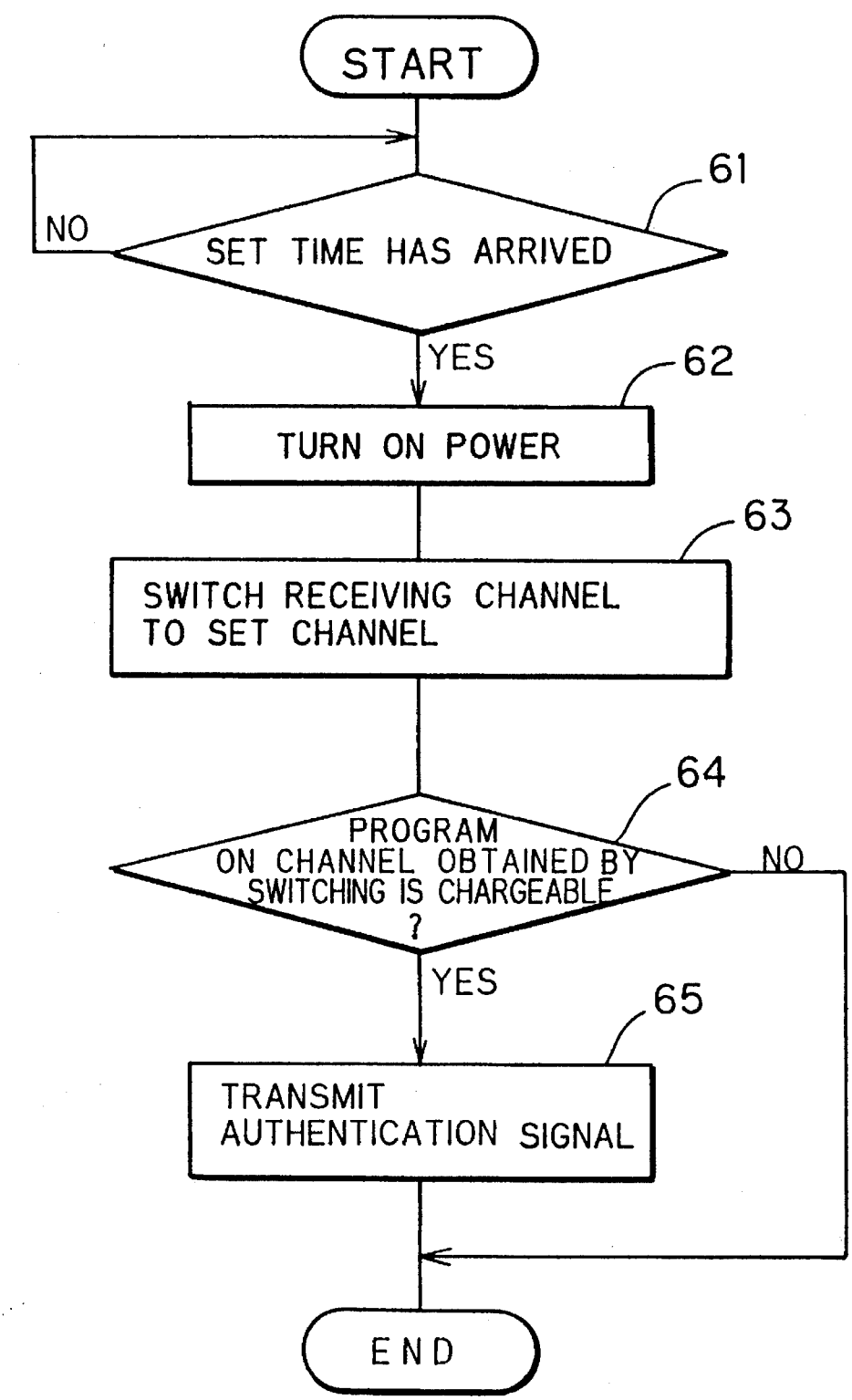
FIG. 9 is a flow chart showing timer-recording processing performed by a CPU in a CATV terminal device.

Referring to the two-way communication CATV system shown in FIGS. 1 and 4 and FIG. 9, description is now made of an embodiment of a CATV terminal device capable of normally timer-recording a chargeable broadcasting program.

FIG. 9 shows timer-recording processing performed by the CPU 42 in the CATV terminal device shown in FIG. 4.

When the timer-recording processing is performed, the time when the sub power supply is turned on and the time when the sub power supply is turned off are set by the timer circuit 49, and a channel to be received when the sub power Supply is turned on is set in the CPU 42. Even when the sub power supply is turned off, the main power supply is turned on, so that the CPU 42 is driven. In addition, a timer in a VTR connected to the CATV terminal device is set to the same time as the set time in the timer circuit 49.

If the time when the sub power supply is turned on has arrived (step 61), the sub power supply of the CATV terminal device is turned on (step 62), and a receiving channel is switched to the channel set in the timer circuit 49 (step 63).

When the receiving channel is switched to the channel see in the timer circuit 49, control data including identification data indicating whether a program currently being received is a chargeable broadcasting program or a non-chargeable broadcasting program is sent from the CATV broadcasting station 1. It is determined on the basis of the sent identification data whether a received program is a chargeable broadcasting program or a non-chargeable broadcasting program (step 64).

If it is determined that the received program is a chargeable broadcasting program, an authentication signal indicating that a viewer intends to view the chargeable broadcasting program is transmitted to the CATV broadcasting station 1 during the cleaning time (step 65). Consequently, an image is not scrambled even after the cleaning time has terminated. Therefore, it is possible to normally timer-record the chargeable broadcasting program.

Meanwhile, in the two-way communication CATV system as shown in FIG. 1, the number of channels which can be received is very large, for example, several tens. Therefore, it is considered that such a scanning function that the receiving channel is automatically switched for each predetermined time period if the viewer selects a scanning mode by a remote controller or the like is given to the CATV terminal device in order that the viewer can simply know the contents of channels which can be currently received.

When the number of channels which can be received is very large, however, it takes very long to scan all the channels, so that too long time is required to select a program which the viewer wishes to view.

In order to solve this program, a method of previously storing only a plurality of particular channels out of the channels which can be received in a memory for scanning and scanning only the plurality of particular channels stored in the memory for scanning when a scanning mode is selected is considered. In this method, however, the plurality of particular channels must be previously selected and stored in the memory for scanning, the operation of which is laborious. In addition, a memory for scanning only is required.

Referring now to the two-way communication CATV system shown in FIGS. 1 to 4 and FIGS. 10 and 11, an embodiment of a CATV terminal device solving the above described problems will be described.

One of services of the two-way communication CATV system as shown in FIG. 1 is a service for responding with the genre of a program which is being currently broadcasted on each channel by a request (a genre request) from the CATV terminal device. For example, when a viewer wishes to know the genre of a program which is being currently broadcasted on channel 10, a genre request "genre-10" is transmitted to the CATV broadcasting station 1 from the CATV terminal device. The CATV broadcasting station 1 receives this genre request, it transmits a genre identification number to the CATV terminal device from which the genre request is transmitted in accordance with the genre of a program on the channel corresponding to the genre request.

For example, an identification number corresponding to each genre is predetermined. That is, an identification number corresponding to movies is "1", an identification number corresponding to sports is "2", an identification number corresponding to news is "3", an identification number corresponding to music is "4", an identification number corresponding to variety is "5", and an identification number corresponding to the other genres is "6". The CATV terminal device can know the genre of a program which is broadcasted on the channel 10 without switching the channels by the genre identification number transmitted from the CATV broadcasting station 1.

Figure 10:
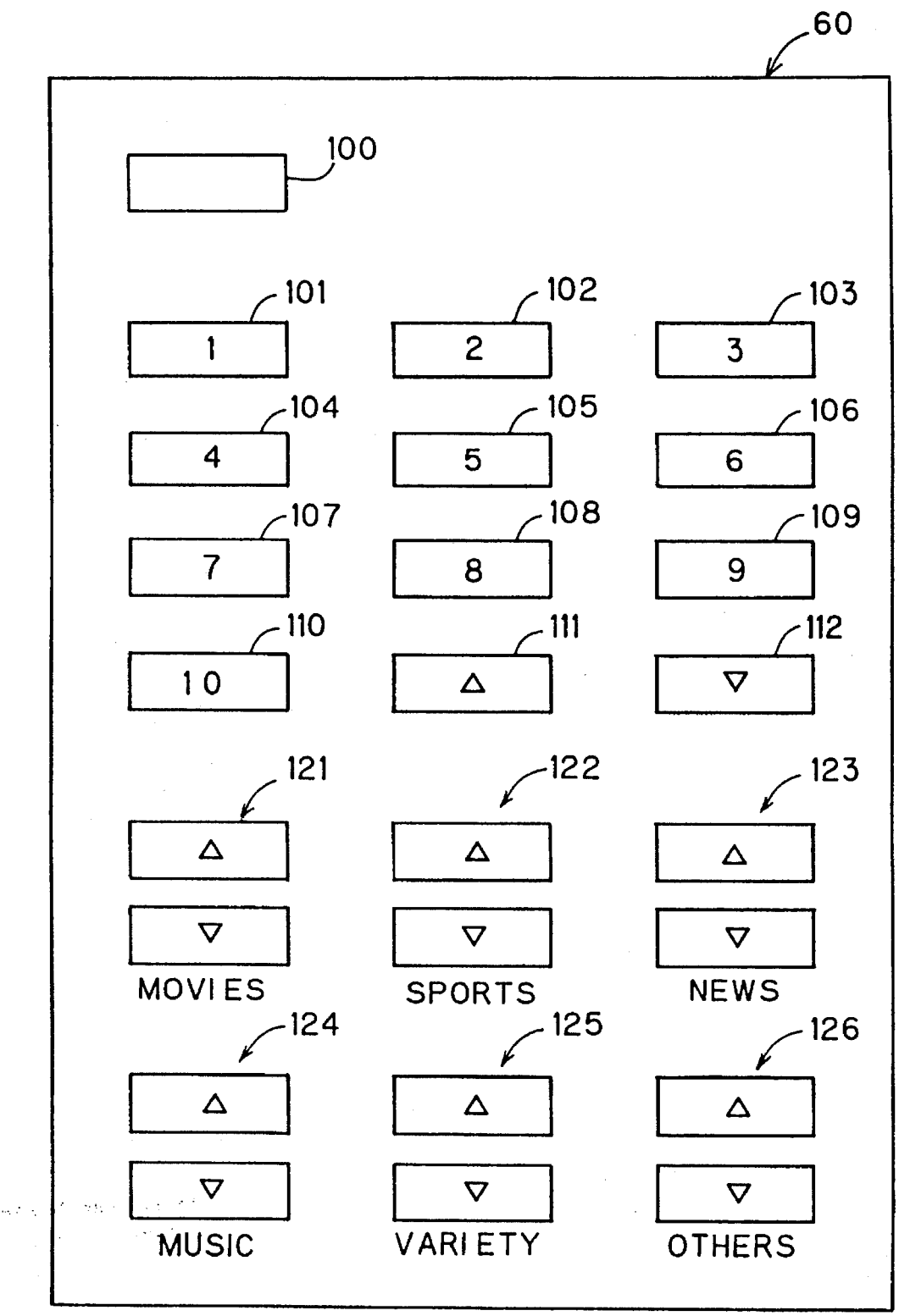
FIG. 10 is a plan view showing a remote controller for inputting various instruction data to a CATV terminal device.

FIG. 10 shows a remove controller used in a CATV terminal device. The remote controller 60 is provided with a power switch 100, 10 channel selecting switches 101 to 110 for selecting a desired channel out of 10 channels previously set, a channel switch 111 for switching channels in ascending order of channel numbers, and a channel switch 112 for switching channels in descending order of channel numbers, similarly to a general remote controller.

Furthermore, the remote controller 60 is provided with six pairs of scanning keys 121 to 126 corresponding to six genres, that is, "movies", "sports", "news", "music", "variety" and "the others". Each of the pairs of scanning keys comprises a forward direction scanning key for scanning channels in ascending order of channel numbers and a reverse direction scanning key for scanning channels in descending order of channel numbers.

When a viewer wishes to know the contents of a program corresponding to a particular genre out of channels which can be currently received, for example, the viewer depresses a scanning key corresponding to the particular genre. For example, when the viewer wishes to know the contents of a movie program, the viewer depresses one scanning key in the pair of scanning keys corresponding to movies 121.

Figure 11:
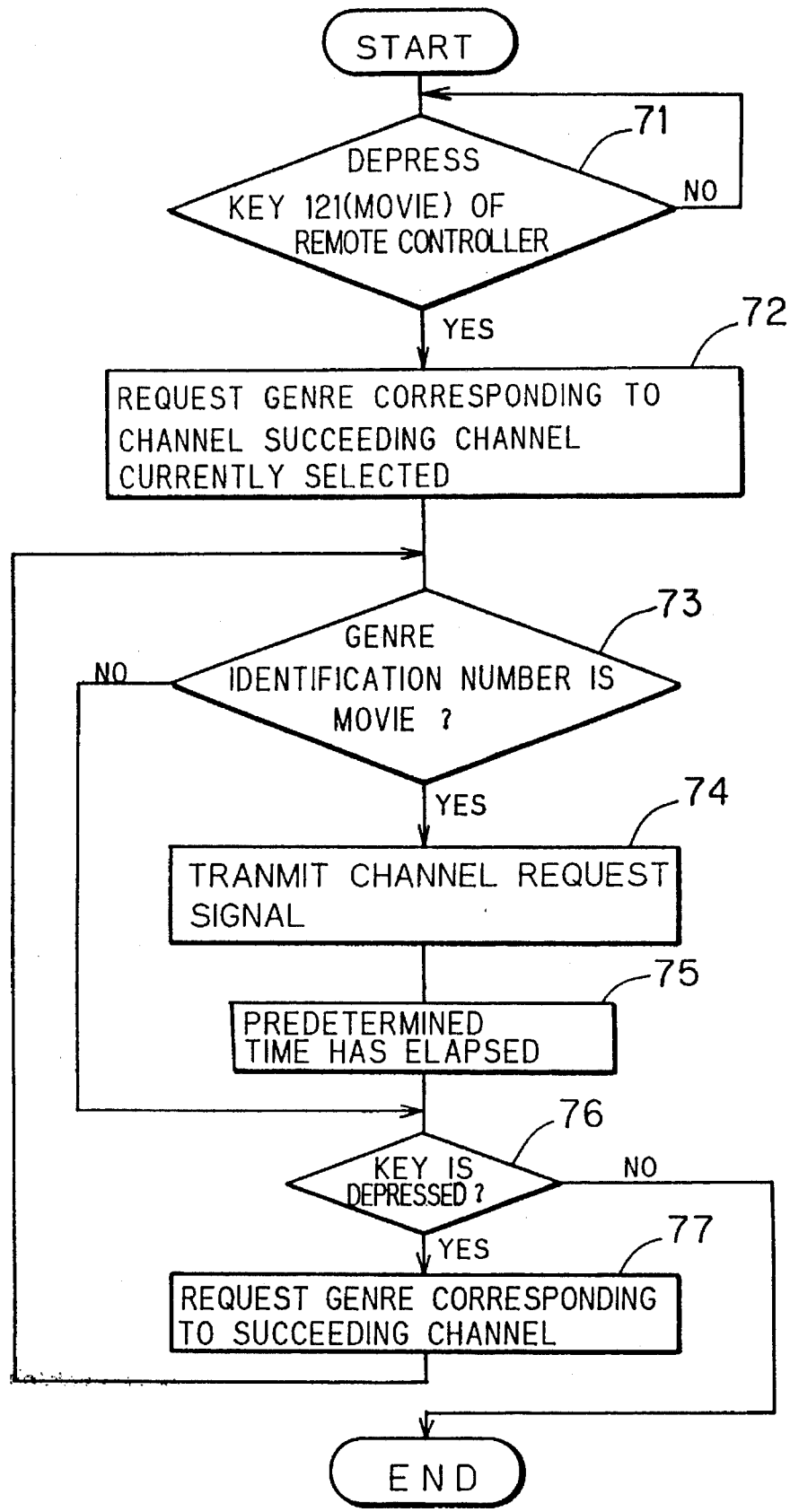
FIG. 11 is a flow chart showing program scanning processing for each genre performed by a CPU in a CATV terminal device.

FIG. 11 shows the procedure of processing performed by the CPU 42 (see FIG. 4) when any one of the pairs of scanning keys 121 to 126 is depressed.

Description is now made of operations performed by the CPU 42 when the forward direction scanning key in the pair of scanning keys corresponding to movies 121 is depressed.

When the forward direction scanning key in the pair of scanning keys corresponding-to movies 121 is depressed (step 71), a genre request corresponding to a channel succeeding a channel currently selected is transmitted to the CATV broadcasting station 1 (step 72).

If a genre identification number is sent from the CATV broadcasting station 1 with respect to the genre request, it is determined whether or not the sent identification number is an identification number corresponding to the genre corresponding to the key depressed in the foregoing step 71 (step 73). In this example, it is determined whether or not the sent identification number is an identification number corresponding to movies "1". If the sent identification number is an identification number corresponding to movies "1", a channel request signal corresponding to the channel is transmitted to the hub 2 (step 74).

Consequently, a broadcasting signal corresponding to a program (movie program) which is broadcasted on the above described channel is transmitted to the CATV terminal device, so that the program corresponding to the channel is broadcasted on a television. Specifically, when the genre of a program which is broadcasted on the channel corresponding to the genre request in the foregoing step 72 is the genre "movies", a receiving channel is switched to the channel corresponding to the genre request, so that the program on the channel corresponding to the genre request is broadcasted.

When a predetermined time period has elapsed since the above described movie program was broadcasted (step 75), it is determined whether the forward direction scanning key or the reverse direction scanning key in the pair of scanning keys 121 is depressed (step 76).

When the sent identification number is not an identification number corresponding to movies "1" in the foregoing step 73, the program proceeds to the step 76 without switching of the receiving channel. In the step 76, it is determined whether or not the forward direction scanning key or the reverse direction scanning key in the pair of scanning keys 121 is depressed.

When it is determined in the step 76 that the scanning key belonging to the pair of scanning keys 121 is not depressed, the processing is terminated.

If it is determined in the step 76 that the forward direction scanning key is depressed, a genre request corresponding to the succeeding channel is sent to the CATV broadcasting station 1 in the forward direction (step 77). If it is determined in the step 76 that the reverse direction scanning key is depressed, the genre request corresponding to the succeeding channel is sent to the CATV broadcasting station 1 in the reverse direction (step 77).

The processing in the step 77 is performed and then, the program is returned to the foregoing step 73. The processing in the steps 73 to 76 is performed again. In this case, if the genre of a program on the channel corresponding to the genre request in the foregoing step 77 is the genre "movies", the program is broadcasted for a predetermined time period. If the forward direction scanning key or the reverse direction scanning key in the pair of scanning keys 121 is depressed in the step 76, the processing in the steps 77 and 73 to 76 is repeated.

Although description was made of a case where the scanning key corresponding to movies 121 is depressed, the same processing is performed even when the scanning keys corresponding to the other genres 122 to 126 are depressed.

According to the above described embodiments, it is possible to scan and view only a program corresponding to a desired genre out of programs which can be currently received. In other words, it is possible to scan and view a program for each genre. Consequently, a viewer can retrieve desired program in a short time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a two-way communication CATV system having
   a CATV broadcasting station for transmitting a CATV broadcasting signal including frequency-division-multiplexed broadcasting signals corresponding to a plurality of channels;

a plurality of CATV terminal devices respectively assigned different particular frequencies for transmitting channel request signals for requesting channels desired out of said plurality of channels; and a relay device for receiving the CATV broadcasting signal transmitted from said CATV broadcasting station as well as receiving the channel request signals transmitted from said CATV terminal devices, frequency-converting the broadcasting signal corresponding to the channel requested by the channel request signal transmitted from each of said CATV terminal devices out of the broadcasting signals corresponding to the plurality of channels included in said CATV broadcasting signal into a broadcasting signal having the particular frequency assigned to the corresponding CATV terminal device and transmitting the broadcasting signal to the corresponding CATV terminal device, each of the plurality of CATV terminal devices in the two-way communication CATV system comprising:

storing means for storing a recognition number;

frequency determining means for determining the frequency of the broadcasting signal transmitted from said relay device; and recognition number setting means for determining the recognition number depending on the frequency determined by said frequency determining means and storing the determined recognition number in said storing means.

2. In the two-way communication CATV system according to claim 1, wherein the particular frequency determined by each of said CATV terminal devices is selected from frequencies corresponding to channel BS-1, channel BS-5, channel BS-9 and channel BS-15.

3. In the two-way communication CATV system according to claim 1, wherein in the CATV terminal device, said frequency determining means comprises an oscillator whose oscillation frequency can be varied, a mixer for frequency-converting the broadcasting signal transmitted from said relay device depending on the oscillation frequency of said oscillator, a band-pass filter for passing only a signal component, in a predetermined intermediate frequency band, of an output signal of said mixer, first determining means for determining whether or not the value of the signal component in the predetermined intermediate frequency band which is output from said band-pass filter is not less than a predetermined threshold value, and second determining means for determining the frequency of said broadcasting signal transmitted from said relay device on the basis of the results of the determination made by said first determining means when the oscillation frequency of said oscillator is changed into a plurality of frequencies, which are respectively determined for the particular frequencies determined by said CATV terminal devices, for converting the particular frequencies into a frequency in said predetermined intermediate frequency band.

4. In the two-way communication CATV system according to claim 3, wherein the particular frequency determined by each of said CATV terminal devices is selected from frequencies corresponding to channel BS-1, channel BS-5, channel BS-9 and channel BS-15.

5. In the two-way communication CATV system according to claim 1, wherein said relay device comprises a hub and a terminating device, said hub comprising means for receiving said CATV broadcasting signal transmitted from said CATV broadcasting station as well as receiving the channel request signals transmitted from said CATV terminal devices through said terminating device, means for frequency-converting the broadcasting signal corresponding to the channel requested by the channel request signals transmitted from each of said CATV terminal devices out of the broadcasting signals corresponding to said plurality of channels included in said CATV broadcasting signal into the broadcasting signal having the particular frequency assigned to the corresponding CATV terminal device, and means for frequency-division-multiplexing a plurality of broadcasting signals obtained by the frequency-conversion to generate a broadcasting multiple signal and transmitting the generated broadcasting multiple signal to said terminating device, said terminating device comprising means for separating the broadcasting multiple signal, transmitted from said hub, into the broadcasting signals having the particular frequencies respectively assigned to said CATV terminal devices, and means for receiving the channel request signals transmitted from said respective CATV terminal devices to transmit the channel request signals to said hub.

6. In the two-way communication CATV system according to claim 5, wherein the particular frequency determined by each of said CATV terminal devices is selected from frequencies corresponding to channel BS-1, channel BS-5, channel BS-9 and channel BS-15.

7. In the two-way communication CATV system according to claim 5, wherein in the CATV terminal device, said frequency determining means comprises an oscillator whose oscillation frequency can be varied, a mixer for frequency-converting the broadcasting signal transmitted from said relay device depending on the oscillation frequency of said oscillator, a band-pass filter for passing only a signal component, in a predetermined intermediate frequency band, of an output signal of said mixer, first determining means for determining whether or not the value of the signal component in the predetermined intermediate frequency band which is output from said band-pass filter is not less than a predetermined threshold value, and second determining means for determining the frequency of said broadcasting signal transmitted from said relay device on the basis of the results of the determination made by said first determining means when the oscillation frequency of said oscillator is changed into a plurality of frequencies, respectively determined for the particular frequencies determined by said CATV terminal devices, for converting the particular frequencies into a frequency in said predetermined intermediate frequency band.

8. In the two-way communication CATV system according to claim 7, wherein the particular frequency determined by each of said CATV terminal devices is selected from frequencies corresponding to channel BS-1, channel BS-5, channel BS-9 and channel BS-15.

9. In a two-way communication CATV system comprising a communication control station and a plurality of CATV terminal devices connected to said communication control station, different recognition numbers being respectively set in said CATV terminal devices, a method of automatically setting recognition numbers assigned to CATV terminal devices in the two-way communication CATV system comprising the steps of:

automatically setting a temporary recognition number different from a normal recognition number in a newly subscribed CATV terminal device, transmitting an inquiry message from said communication control station for inquiring of said newly subscribed CATV terminal device whether or not receiving is possible using said temporary recognition number, transmitting a response message from said newly subscribed CATV terminal device indicating that receiving is possible to said communication control station when said newly subscribed CATV terminal device receives said inquiry message from said communication control station, transmitting the normal recognition number to said newly subscribed CATV terminal device from said communication control station when said communication control station receives said response message indicating that receiving is possible from said newly subscribed CATV terminal device, and setting by said newly subscribed CATV terminal device, when said newly subscribed CATV terminal device receives said normal recognition number from said communication control station, the received normal recognition number as a recognition number assigned to the CATV terminal device.

10. The method of automatically setting recognition numbers assigned to CATV terminal devices in the two-way communication CATV system according to claim 9, wherein said two-way communication CATV system comprises, a CATV broadcasting station for transmitting a CATV broadcasting signal including frequency-division-multiplexed broadcasting signals corresponding to a plurality of channels, the plurality of CATV terminal devices respectively assigned different particular frequencies for transmitting channel request signals for requesting channels desired out of said plurality of channels, and a relay device for receiving the CATV broadcasting signal transmitted from said CATV broadcasting station as well as receiving the channel request signals transmitted from said CATV terminal devices, frequency-converting the broadcasting signal corresponding to the channel requested by the channel request signal transmitted from each of said CATV terminal devices out of the broadcasting signals corresponding to the plurality of channels included in said CATV broadcasting signal into a broadcasting signal having the particular frequency assigned to the corresponding CATV terminal device and transmitting the broadcasting signal to a subscriber's home where the corresponding CATV terminal device is installed, said communication control station being provided for said relay device.

11. The method of automatically setting recognition numbers assigned to CATV terminal devices in the two-way communication CATV system according to claim 10, wherein the particular frequency determined by each of said CATV terminal devices is selected from frequencies corresponding to channel BS-1, channel BS-5, channel BS-9 and channel BS-15.

12. The method of automatically setting recognition numbers assigned to CATV terminal devices in the two-way communication CATV system according to claim 10, wherein said relay device comprises a hub and a terminating device, said hub comprising means for receiving said CATV broadcasting signal transmitted from said CATV broadcasting station as well as receiving the channel request signals transmitted from said CATV terminal devices through said terminating device, means for frequency-converting the broadcasting signal corresponding to the channel requested by the channel request signals transmitted from each of said CATV terminal devices out of the broadcasting signals corresponding to said plurality of channels included in said CATV broadcasting signal into the broadcasting signal having the particular frequency assigned to the corresponding CATV terminal device, and means for frequency-division-multiplexing a plurality of broadcasting signals obtained by the frequency-conversion to generate a broadcasting multiple signal and transmitting the generated broadcasting multiple signal to said terminating device, said terminating device comprising mean for separating the broadcasting multiple signal, transmitted from said hub, into broadcasting signals for subscribers' homes where the corresponding CATV terminal devices are respectively installed, and means for receiving the channel request signals transmitted from said respective CATV terminal devices to transmit the channel request signals to said hub, said communication control station being provided for said hub.

13. The method of automatically setting recognition numbers assigned to CATV terminal devices in the two-way communication CATV system according to claim 12, wherein the particular frequency determined by each of said CATV terminal devices is selected from frequencies corresponding to channel BS-1, channel BS-5, channel BS-9 and channel BS-15.

14. In a two-way communication CATV system comprising a communication control station and a plurality of CATV terminal devices connected to said communication control station, different recognition numbers being respectively set in said CATV terminal devices, a device for automatically setting recognition numbers assigned to CATV terminal devices in the two-way communication CATV system comprising:

means provided for a newly subscribed CATV terminal device for automatically setting a temporary recognition number different from a normal recognition number in said newly subscribed CATV terminal device;

means provided for said communication control station for transmitting an inquiry message for inquiring of said newly subscribed CATV terminal device whether or not receiving is possible using said temporary recognition number;

means provided for said newly subscribed CATV terminal device for transmitting a response message indicating that receiving is possible to said communication control station when said newly subscribed CATV terminal device receives said inquiry message from said communication control station;

means provided for said communication control station for transmitting the normal recognition number to said newly subscribed CATV terminal device when said communication control station receives said response message indicating that receiving is possible from said newly subscribed CATV terminal device; and means provided for said newly subscribed CATV terminal device for setting, when said newly subscribed CATV terminal device receives said normal recognition number from said communication control station, said received normal recognition number as a recognition number assigned to the CATV terminal device.

15. The device for automatically setting recognition numbers assigned to CATV terminal devices in the two-way communication CATV system according to claim 14, wherein said two-way communication CATV system comprises a CATV broadcasting station for transmitting a CATV broadcasting signal including frequency-division-multiplexed broadcasting signals corresponding to a plurality of channels, the plurality of CATV terminal devices respectively assigned different particular frequencies for transmitting channel request signals for requesting channels desired out of said plurality of channels, and a relay device for receiving the CATV broadcasting signal transmitted from said CATV broadcasting station as well as receiving the channel request signals transmitted from said CATV terminal devices, frequency-converting the broadcasting signal corresponding to the channel requested by the channel request signal transmitted from each of said CATV terminal devices out of the broadcasting signals corresponding to the plurality of channels included in said CATV broadcasting signal into a broadcasting signal having the particular frequency assigned to the corresponding CATV terminal device and transmitting the broadcasting signal to a subscriber's home where the corresponding CATV terminal device is installed, said communication control station being provided for said relay device.

16. The device for automatically setting recognition numbers assigned to CATV terminal devices in the two-way communication CATV system according to claim 15, wherein the particular frequency determined by each of said CATV terminal devices is selected from frequencies corresponding to channel BS-1, channel BS-5, channel BS-9 and channel BS-15.

17. The device for automatically setting recognition numbers assigned to CATV terminal devices in the two-way communication CATV system according to claim 16, wherein said relay device comprises a hub and a terminating device, said hub comprising means for receiving said CATV broadcasting signal transmitted from said CATV broadcasting station as well as receiving the channel request signals transmitted from said CATV terminal devices through said terminating device, means for frequency-converting the broadcasting signal corresponding to the channel requested by the channel request signals transmitted from each of said CATV terminal devices out of the broadcasting signals corresponding to said plurality of channels included in said CATV broadcasting signal into the broadcasting signal having the particular frequency assigned to the corresponding CATV terminal device, and means for frequency-division-multiplexing a plurality of broadcasting signals obtained by the frequency-conversion to generate a broadcasting multiple signal and transmitting the generated broadcasting multiple signal to said terminating device, said terminating device comprising mean for separating the broadcasting multiple signal, transmitted from said hub, into broadcasting signals for subscribers' homes where the corresponding CATV terminal devices are respectively installed, and means for receiving the channel request signals transmitted from said respective CATV terminal devices to transmit the channel request signals to said hub, said communication control station being provided for said hub.

18. In a two-way communication CATV system comprising a CATV broadcasting station and a CATV terminal device, in which when a chargeable broadcasting program provided from said CATV broadcasting station is received by said CATV terminal device, said chargeable broadcasting program can be continuously viewed in a normal state only when a predetermined authentication signal is transmitted from said CATV terminal device to said CATV broadcasting station within a predetermined time period, the CATV terminal device in the two-way communication CATV system comprising:

setting means for setting receiving time and a channel to be received at the receiving time;

receiving channel switching means for switching a receiving channel to the channel set in said setting means when the time set by said setting means has arrived;

determining means for determining whether a received program on the channel to which the receiving channel is switched by said receiving channel switching means is a chargeable broadcasting program or a non-chargeable broadcasting program on the basis of control data transmitted from said CATV broadcasting station; and means for transmitting said predetermined authentication signal to said CATV broadcasting station within said predetermined time period when said determining means determines that said received program is the chargeable broadcasting program.

19. In a two-way communication CATV system comprising a CATV broadcasting station and a CATV terminal device, in which said CATV terminal device inquires of said CATV broadcasting station a genre of each of a plurality of programs provided by said CATV broadcasting station, so that a response indicating the inquired genre of the program is sent to said CATV terminal device from said CATV broadcasting station, the CATV terminal device in the two-way communication CATV system comprising:

input means for inputting one genre which a viewer desires to view out of a plurality of genres;

retrieving means for inquiring of said CATV broadcasting station the genre of each of the programs provided by said CATV broadcasting station when the one genre which the viewer desires to view is input by said input means to retrieve the program corresponding to the one genre input by said input means out of the programs provided by said CATV broadcasting station; and scanning means for switching a receiving channel so that the programs retrieved by said retrieving means are sequentially received for each predetermined time period.

\* \* \* \* \*